(12) United States Patent
Tseng et al.

(10) Patent No.: US 8,373,935 B2
(45) Date of Patent: Feb. 12, 2013

(54) FIXED-FOCUS LENS

(75) Inventors: Chien-Hsiung Tseng, Hsinchu (TW);
Yu-Hung Chou, Hsinchu (TW);
Kai-Yun Chen, Hsinchu (TW);
Ying-Hsiu Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 168 days.

(21) Appl. No.: 13/094,838

(22) Filed: Apr. 27, 2011

(65) Prior Publication Data
US 2012/0081799 A1    Apr. 5, 2012

(30) Foreign Application Priority Data
Sep. 30, 2010    (TW) ................ 99133373 A

(51) Int. Cl.
*G02B 13/18* (2006.01)
*G02B 3/02* (2006.01)
*G02B 9/00* (2006.01)
*G02B 9/08* (2006.01)

(52) U.S. Cl. ........................... 359/713; 359/740

(58) Field of Classification Search ............... 359/761, 359/794, 793, 740, 713
See application file for complete search history.

(56) References Cited

U.S. PATENT DOCUMENTS

| 5,920,433 A | 7/1999 | Sugawara |
| 7,173,766 B2 | 2/2007 | Kimura et al. |
| 7,397,610 B2 | 7/2008 | Wada |

FOREIGN PATENT DOCUMENTS

TW    201011337    3/2010

*Primary Examiner* — Alicia M Harrington
(74) *Attorney, Agent, or Firm* — Jianq Chyun IP Office

(57) ABSTRACT

A fixed-focus lens disposed between an enlarged side and a reduced side is provided. An f-number of the fixed-focus lens is smaller than or equal to 2. The fixed-focus lens includes a first lens group and a second lens group. The first lens group includes a first lens, wherein the first lens is an aspheric lens. The second lens group, disposed between the first lens group and the reduced side, has a positive dioptre. The second lens group includes a second lens, wherein the second lens is an aspheric lens. The fixed-focus lens focuses by moving the first and the second lens group and satisfies $0.1<|f/f1|<1$, $0.2<|f/f2|<1.5$, and $1.5<L/BFL<3.5$, where f, L, and BFL are respectively a focal length, a total length, and a back focal length of the fixed-focus lens, and f1 and f2 are respectively an effective focal length of the first and the second lens group.

20 Claims, 26 Drawing Sheets

FIXED-FOCUS LENS

CROSS-REFERENCE TO RELATED APPLICATION

This application claims the priority benefit of Taiwan application serial no. 99133373, filed Sep. 30, 2010. The entirety of the above-mentioned patent application is hereby incorporated by reference herein and made a part of this specification.

BACKGROUND OF THE INVENTION

1. Field of the Invention

The invention generally relates to a lens, and more particularly, to a fixed-focus lens.

2. Description of Related Art

An existing small light emitting diode (LED) projectors usually produces a brightness of merely 100 lumens. To increase the brightness of a small LED projector without increasing the power of LED, a lens with a large aperture has to be adopted to increase the light utilization efficiency.

Image aberration has always been a major problem in the design of lenses with large apertures (for example, with their f-numbers smaller than 2). One technique for resolving this problem is to adopt aspheric lenses. For example, a lens with two aspheric lenses is disclosed in U.S. Pat. No. 5,920,433. However, because this lens is composed of 10 lenses and the total length of the lens is over 75 mm, the overall size of the lens is very large.

In addition, a lens with two aspheric lenses or at least one molded glass lens is disclosed in U.S. Pat. No. 7,397,610. Because the lenses in foregoing lens are grouped into three lens groups and the lens focuses by moving the second lens group, the fabrication cost of the lens is greatly increased. Besides, the f-number of foregoing lens is only between 1.74 and 2.16. Thus, if the aspheric lenses are removed to reduce the fabrication cost and the image aberration is to be reduced, more lenses have to be adopted. For example, in U.S. Pat. No. 7,173,766, 15 lenses are disposed in order to reduce the image aberration. On the other hand, a lens with a first lens group and a second lens group is disclosed in Taiwan Patent No. 201011337, wherein the first lens group and the second lens groups respectively have a positive dioptre. The first lens group and the second lens group both have aspheric lenses. However, foregoing lens has an f-number of 3.24 and a small aperture.

SUMMARY OF THE INVENTION

Accordingly, the invention is directed to a fixed-focus lens which has a lower fabrication cost and better optical characteristics than convention.

Additional aspects and advantages of the invention will be set forth in following description.

To achieve one of, a part of or all of the above-mentioned advantages, or to achieve other advantages, an embodiment of the invention provides a fixed-focus lens disposed between an enlarged side and a reduced side. The fixed-focus lens includes a first lens group and a second lens group. The first lens group includes a first lens, wherein the first lens is an aspheric lens. The second lens group has a positive dioptre and is disposed between the first lens group and the reduced side. The second lens group includes a second lens, wherein the second lens is an aspheric lens. An f-number of the fixed-focus lens is smaller than or equal to 2. The fixed-focus lens focuses by moving the first lens group and the second lens group, and the fixed-focus lens satisfies $0.1<|f/f1|<1$, $0.2<|f/f2|<1.5$, and $1.5<L/BFL<3.5$, wherein f is a focal length of the fixed-focus lens, f1 is an effective focal length (EFL) of the first lens group, f2 is an EFL of the second lens group, L is a total length of the fixed-focus lens, and BFL is a back focal length of the fixed-focus lens.

As described above, an embodiment of the invention offers at least one of following advantages or functions. Because according to an embodiment of the invention, the fixed-focus lens has two aspheric lenses and the overall structure of the fixed-focus lens satisfies aforementioned conditions, the fixed-focus lens has a large aperture and reduced aberration such that an optimal imaging quality is achieved. In addition, because according to an embodiment of the invention, the fixed-focus lens adopts fewer lenses and offers a simple focusing technique, both the structure and the assembly of the fixed-focus lens are simplified, and the fabrication cost of the fixed-focus lens is reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
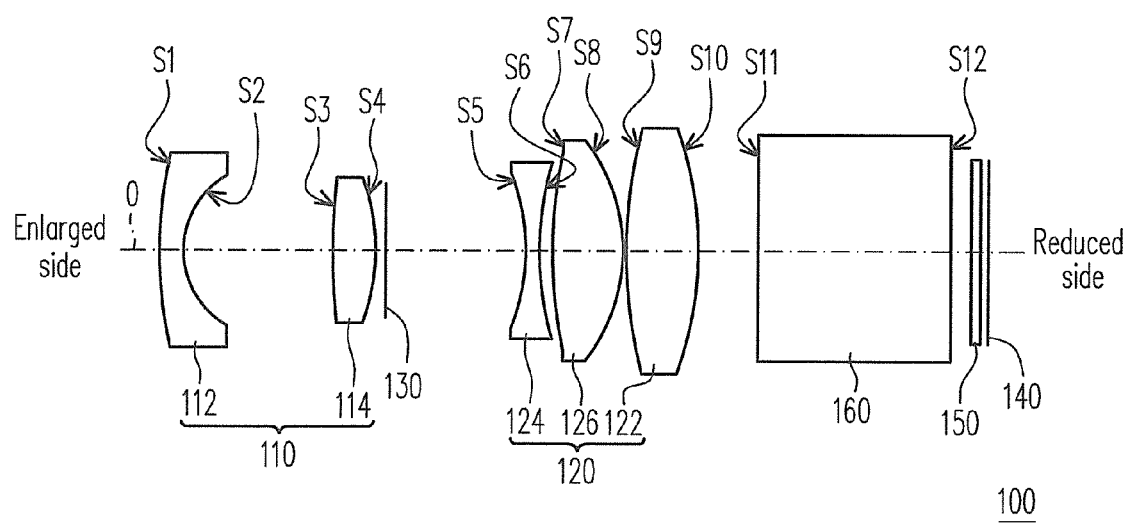
FIG. 1 is a structure diagram of a fixed-focus lens according to a first embodiment of the invention.

FIG. 1 is a structure diagram of a fixed-focus lens according to the first embodiment of the invention. Referring to FIG. 1, in the present embodiment, the fixed-focus lens 100 is disposed between an enlarged side and a reduced side and includes a first lens group 110 and a second lens group 120 sequentially arranged from the enlarged side to the reduced side. The first lens group 110 includes a lens 112, wherein the lens 112 is an aspheric lens. The second lens group 120 has a positive dioptre and is disposed between the first lens group 110 and the reduced side. The second lens group 120 includes a lens 122, wherein the lens 122 is an aspheric lens.

In the present embodiment, the fixed-focus lens 100 focuses by moving the first lens group 110 and the second lens group 120, and the fixed-focus lens 100 satisfies $0.1<|f/f1|<1$, $0.2<|f/f2|<1.5$, and $1.5<L/BEL<3.5$, wherein f is the focal length of the fixed-focus lens 100, f1 is the effective focal length (EFL) of the first lens group 110, f2 is the EFL of the second lens group 120, L is the total length of the fixed-focus lens 100, and BFL is the back focal length of the fixed-focus lens 100.

As shown in FIG. 1, in the present embodiment, the first lens group 110 has a positive dioptre, and the first lens group 110 further includes a lens 114 disposed between the lens 112 and the second lens group 120. However, in other embodiments, the lens 114 may also be disposed between the enlarged side and the lens 112. In addition, the EFL of the lens 112 is fasp1, and the fixed-focus lens 100 satisfies $0.1<|fasp1/f1|<11$. The lens 112 is a meniscus lens having its convex surface facing the enlarged side, and the lens 112 has a negative dioptre.

The fixed-focus lens 100 further includes an aperture diaphragm 130 disposed between the first lens group 110 and the second lens group 120. In the present embodiment, the second lens group 120 further includes a lens 124 and a lens 126. The lens 124 and the lens 126 respectively have a negative dioptre and a positive dioptre. The lens 124 and the lens 126 are disposed between the aperture diaphragm 130 and the lens 122.

To be specific, in the present embodiment, the lens 114 is a biconvex lens, the lens 124 is a biconcave lens, the lens 126 is a biconvex lens, and the lens 122 is a biconvex lens. Besides, in the fixed-focus lens 100 of the present embodiment, the lens 112 in the first lens group 110 and the lens 122 in the second lens group 120 are both aspheric lenses, and the other three lenses are all spherical lenses. The lens 112 in the first lens group 110 and the lens 122 in the second lens group 120 can effectively reduce the spherical aberration, the coma, the distortion, and the astigmatism of the fixed-focus lens 100, and the different dioptres combination of the lenses in the second lens group 120 can reduce the coma and the distortion of the fixed-focus lens 100. On the other hand, by fabricating the lens 126 with a low-dispersion material, color aberration of the lens can be effectively reduced.

Additionally, in the present embodiment, the lens 122 is the lens in the second lens group 120 that is farthest from the aperture diaphragm 130, and the fixed-focus lens 100 satisfies $0.1<|f/f1|<1$, $0.2\leq|f/f2|<1.5$, and $1.8<L/BEL<3.5$.

Generally, an image processing device 140 may be disposed at the reduced side. In the present embodiment, the image processing device 140 is a light valve, wherein the light valve may be a digital micro-mirror device (DMD), a liquid-crystal-on-silicon (LCOS) panel, or a transmissive liquid crystal panel (LCD). Additionally, in the present embodiment, the fixed-focus lens 100 is able to project images supplied by the image processing device 140 to the enlarged side. Moreover, a glass cover 150 is further attached in front of the image processing device 140 for protecting the same.

On the other hand, in the present embodiment, the fixed-focus lens 100 further includes an optical element 160 disposed between the second lens group 120 and the image processing device 140. The optical element 160 may be a total internal reflection (TIR) prism and may be applied to a projection apparatus.

An example of the fixed-focus lens 100 will be described below. It should be noted that the data in following table 1 is not intended to limit the scope of the invention, and those having ordinary knowledge in the art can appropriately change these parameters and settings according to the present disclosure without departing the scope and spirit of the invention.

TABLE 1

| Surface | Curvature Radius (mm) | Space (mm) | Refractive Index | Abbe Number | Note |
|---|---|---|---|---|---|
| S1 | 45.5 | 2 | 1.49 | 57.44 | Lens 112 |
| S2 | 7.6 | 12.61 | | | |
| S3 | 68.5 | 3.65 | 1.77 | 49.62 | Lens 114 |
| S4 | −18 | 12.69 | | | |
| S5 | −19.6 | 1.2 | 1.85 | 23.78 | Lens 124 |
| S6 | 27.3 | 1.02 | | | |
| S7 | 41 | 6.03 | 1.62 | 63.33 | Lens 126 |
| S8 | −15.5 | 0.15 | | | |
| S9 | 32.36 | 6.14 | 1.53 | 55.95 | Lens 122 |
| S10 | −30.4 | 5.24 | | | |
| S11 | Infinite | 16 | 1.59 | 61.27 | Optical Element |
| S12 | Infinite | 2 | | | |

In foregoing table 1, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 1, the surface S1 is the surface of the lens 112 facing the enlarged side, and the surface S2 is the surface of the lens 112 facing the reduced side. The surfaces S3 and S4 are two surfaces of the lens 114. The surfaces S5 and S6 are two surfaces of the lens 124. The surfaces S7 and S8 are two surfaces of the lens 126. The surfaces S9 and S10 are two surfaces of the lens 122. The surfaces S11 and S12 are two surfaces of the optical element 160.

Moreover, the surfaces S1, S2, S9, and S10 are aspheric surfaces, and which can be expressed as:

$$Z(h) = \frac{cy^2}{1 + \sqrt{1 - (1+K)c^2 y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 1), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S9, and S10 are listed in following table 2.

TABLE 2

| Aspheric Parameter | Conic Constant K | Coefficient $A_2$ | Coefficient $A_3$ | Coefficient $A_4$ |
|---|---|---|---|---|
| S1 | 0 | 3.914E−04 | −1.115E−05 | 1.633E−07 |
| S2 | 0 | 4.65E−04 | −1.145E−05 | −6.585E−08 |
| S9 | 0 | −7.561E−06 | 3.08E−08 | −1.637E−09 |
| S10 | 0 | 2.938E−05 | 4.399E−08 | −3.214E−09 |

TABLE 2-continued

| Aspheric Parameter | Conic Constant K | Coefficient $A_5$ | Coefficient $A_6$ |
|---|---|---|---|
| S1 | 0 | −1.441E−09 | 5.503E−12 |
| S2 | 0 | 4.217E−09 | −7.134E−11 |
| S9 | 0 | −2.809E−13 | 0 |
| S10 | 0 | 8.504E−12 | 0 |

In the present embodiment, the EFL of the fixed-focus lens 100 may be 14.79 mm, the f-number thereof may be 2, and the field of view (FOV, 2ω) thereof may be 55.6°.

Figure 2A:
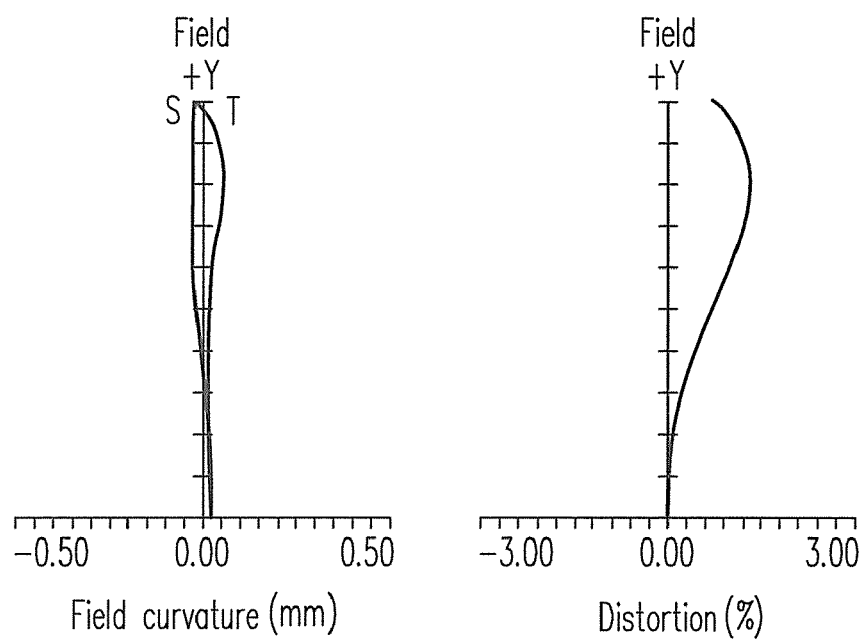
FIGS. 2A-2C are optical imaging simulation data plots of the fixed-focus lens in FIG. 1.
Figure 2B:
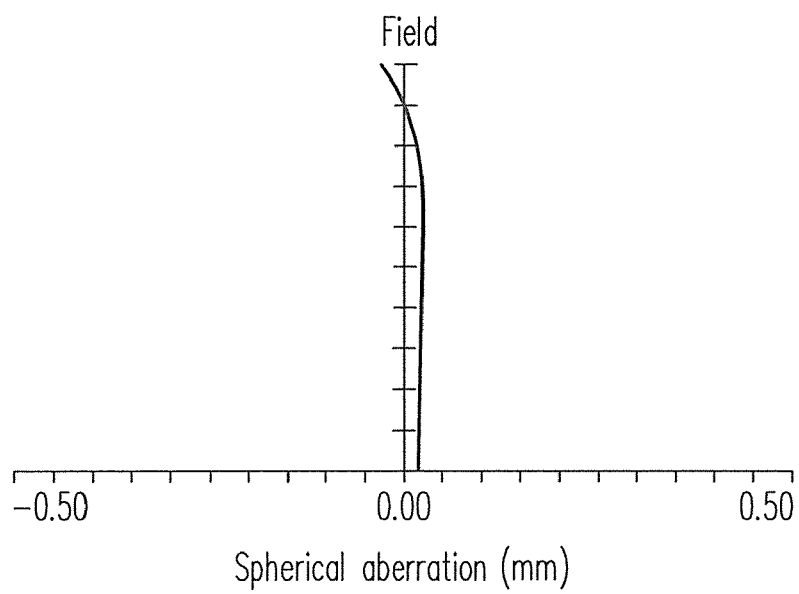
Figure 2C:
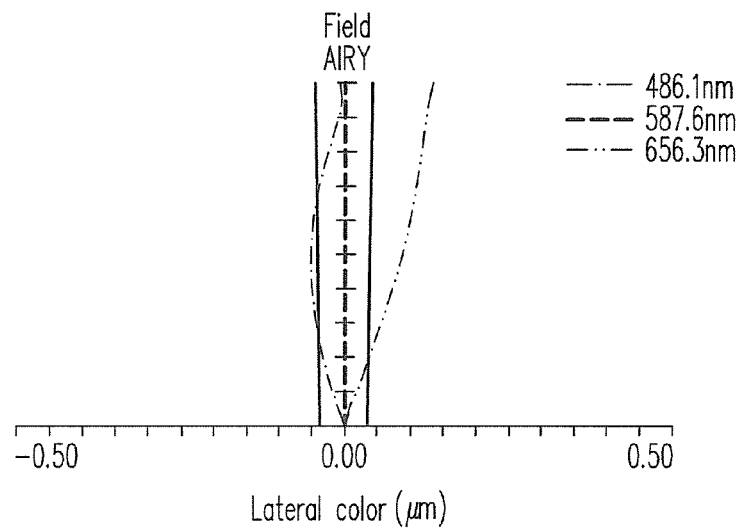

FIGS. 2A-2C are optical imaging simulation data plots of the fixed-focus lens 100 in FIG. 1. Referring to FIGS. 2A-2C, the graphs of field curvature and distortion are sequentially illustrated from left to right in FIG. 2A, the graph of spherical aberration is illustrated in FIG. 2B, and the graph of lateral color aberration is illustrated in FIG. 2C. In the graph of field curvature, the horizontal axis indicates the distance to the focal plane, and the vertical axis indicates the intensity of the field (from 0 to the maximum field intensity 1). In the graph of distortion, the horizontal axis indicates the distortion percentage, and the vertical axis indicates the intensity of the field (from 0 to the maximum field intensity 1). In the graph of spherical aberration, the horizontal axis indicates the distance to a paraxial approximation focal plane, and the vertical axis indicates the intensity of the field (from 0 to the maximum field intensity 1). In the graph of lateral color aberration illustrated in FIG. 2C (herein the lateral color aberration is simulated with green light), the horizontal axis indicates the distance to the green light, and the vertical axis indicates the intensity of the field (from 0 to the maximum field intensity 1). The graphs illustrated in FIGS. 2A-2C indicate that the fixed-focus lens 100 in the present embodiment has very good imaging quality.

Second Embodiment

Figure 3:
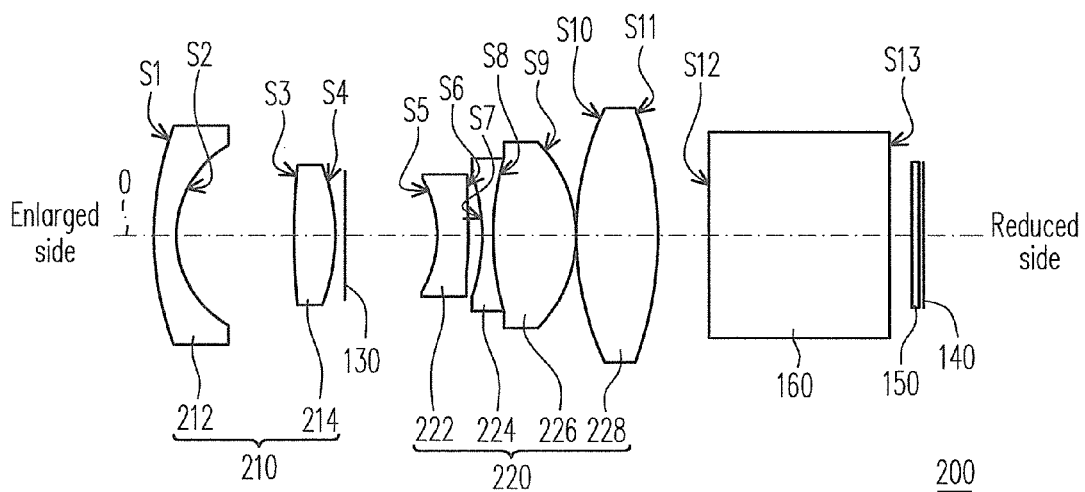
FIG. 3 is a structure diagram of a fixed-focus lens according to a second embodiment of the invention.

FIG. 3 is a structure diagram of a fixed-focus lens according to the second embodiment of the invention. Referring to FIG. 3, in the present embodiment, the fixed-focus lens 200 is disposed between an enlarged side and a reduced side and includes a first lens group 210 and a second lens group 220 sequentially arranged from the enlarged side to the reduced side. The first lens group 210 includes a lens 212, wherein the lens 212 is an aspheric lens. The second lens group 220 has a positive dioptre and is disposed between the first lens group 210 and the reduced side. The second lens group 220 includes a lens 222, wherein the lens 222 is an aspheric lens. The fixed-focus lens 200 focuses by moving the first lens group 210 and the second lens group 220.

In the present embodiment, the lens 222 has a negative dioptre, and the lens 222 is a lens in the second lens group 220 that is closest to the aperture diaphragm 130. Besides, the fixed-focus lens 200 satisfies 0.2<|f/f1|<1, 0.3<|f/f2|<1, and 1.5<L/BFL<3.5, wherein f is the focal length of the fixed-focus lens 200, f1 is the EFL of the first lens group 210, f2 is the EFL of the second lens group 220, L is the total length of the fixed-focus lens 200, and BFL is the back focal length of the fixed-focus lens 200. The lens 212 in the first lens group 210 is a meniscus lens having a convex surface facing the enlarged side, and the dioptre of the lens 212 is negative. To be specific, the EFL of the lens 212 is fasp1, and the fixed-focus lens 200 satisfies 0.5<|fasp1/f1|<3.

As shown in FIG. 3, in the present embodiment, the first lens group 210 has a positive dioptre and includes two lenses. To be specific, the first lens group 210 further includes a lens 214 disposed between the lens 212 and the second lens group 220.

On the other hand, the second lens group 220 further includes a lens 224 and a lens 226 sequentially arranged from the enlarged side to the reduced side. The lens 224 and the lens 226 are disposed between the lens 222 and the reduced side. Besides, the lens 224 has a negative dioptre and the lens 226 has a positive dioptre, and the lens 224 and the lens 226 constitute a cemented doublet lens. In addition, the second lens group 220 further includes a lens 228 disposed between the lens 226 and the reduced side, wherein the dioptre of the lens 228 is positive. Accordingly, the dioptre of the lens 222, the lens 224, the lens 226, and the lens 228 are respectively negative, negative, positive, and positive.

To be specific, in the present embodiment, the lens 214 is a biconvex lens, the lens 222 is a meniscus lens having a concave surface facing the enlarged side, the lens 224 is a biconcave lens, the lens 226 is a biconvex lens, and the lens 228 is a biconvex lens. Additionally, in the present embodiment, the lens 212 and the lens 222 of the fixed-focus lens 200 are aspheric lenses, and the other four lenses are all spherical lenses. The lens 212 and the lens 222 can effectively reduce the spherical aberration, coma, distortion, and astigmatism of the fixed-focus lens 200, and different dioptres combination of the lenses in the second lens group 220 can reduce the coma and distortion of the fixed-focus lens 200. On the other hand, by fabricating the lenses 226 and 228 with a low-dispersion material, color aberration of the large-aperture lens can be reduced. The cemented doublet lens composed of the lens 224 and the lens 226 can reduce the spherical aberration and the color aberration. Color aberration can be effectively reduced by fabricating one of the lens 224 and the lens 226 (for example, the lens 226) with a low-dispersion material.

An example of the fixed-focus lens 200 will be described below. It should be noted that the data in following table 3 is not intended to limit the scope of the invention, and those having ordinary knowledge in the art can appropriately change these parameters and settings according to the present disclosure without departing the scope and spirit of the invention.

TABLE 3

| Surface | Curvature Radius (mm) | Space (mm) | Refractive Index | Abbe Number | Note |
|---|---|---|---|---|---|
| S1 | 65.1 | 2 | 1.49 | 57.44 | Lens 212 |
| S2 | 9.04 | 12.96 | | | |
| S3 | 37.66 | 3.15 | 1.80 | 42.23 | Lens 214 |
| S4 | −25.52 | 7.56 | | | |
| S5 | −12.59 | 3.49 | 1.53 | 55.95 | Lens 222 |
| S6 | −28.18 | 1.06 | | | |
| S7 | −29.5 | 1.2 | 1.81 | 25.43 | Lens 224 |
| S8 | 24.5 | 8.03 | 1.62 | 63.33 | Lens 226 |
| S9 | −16.67 | 0.1 | | | |
| S10 | 38 | 5.96 | 1.50 | 81.55 | Lens 228 |
| S11 | −26 | 8.76 | | | |
| S12 | Infinite | 16 | 1.59 | 61.27 | Optical Element |
| S13 | Infinite | 2 | | | |

In foregoing table 3, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 3, the surface S1 is the surface of the lens 212 facing the enlarged side, and the surface S2 is the surface of the lens 212 facing the reduced side. The surfaces S3 and S4 are two surfaces of the lens 214. The surfaces S5 and S6 are two surfaces of the lens 222. The surfaces S7 is the surface of the lens 224 facing the enlarged side, the surface S8 is the surface connecting the lens 224 and the lens 226, and the surfaces S9 is the surface of the lens 226 facing the reduced side. The surfaces S10 and S11 are two surfaces of the lens 228. The surfaces S12 and S13 are two surfaces of the optical element 160.

Moreover, the surfaces S1, S2, S5, and S6 are aspheric surfaces, and which can be expressed as:

$$Z(h) = \frac{cy^2}{1 + \sqrt{1 - (1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 3), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S5, and S6 are listed in following table 4.

TABLE 4

| Aspheric Parameter | Conic Constant K | Coefficient $A_2$ | Coefficient $A_3$ | Coefficient $A_4$ |
|---|---|---|---|---|
| S1 | 0 | 2.4E−04 | −4.8E−06 | 5.08E−08 |
| S2 | 0 | 2.73E−04 | −4.32E−06 | −3.97E−08 |
| S5 | 0 | 4.54E−04 | −2.74E−06 | 3.58E−09 |
| S6 | 0 | 4.1E−04 | −1.12E−06 | −1.5E−08 |

| Aspheric Parameter | Conic Constant K | Coefficient A5 | Coefficient A6 |
|---|---|---|---|
| S1 | 0 | −3.02E−10 | 7.59E−13 |
| S2 | 0 | 1.34E−09 | −1.35E−11 |
| S5 | 0 | 4.506E−11 | 0 |
| S6 | 0 | 1.173E−10 | 0 |

In the present embodiment, the EFL of the fixed-focus lens 200 may be 15.9 mm, the f-number thereof may be 2, and the FOV (2ω) thereof may be 55.6°.

Figure 4A:
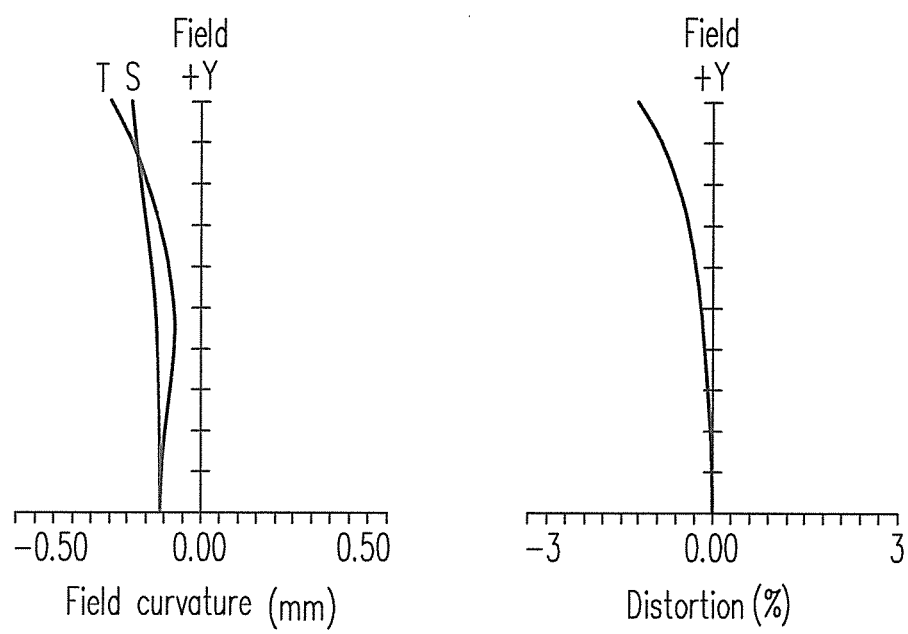
FIGS. 4A-4C are optical imaging simulation data plots of the fixed-focus lens in FIG. 3.
Figure 4B:
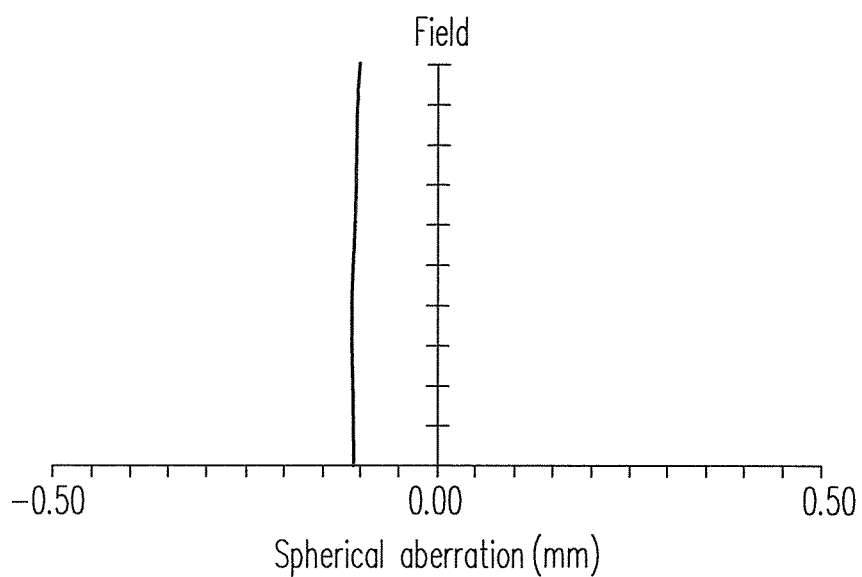
Figure 4C:
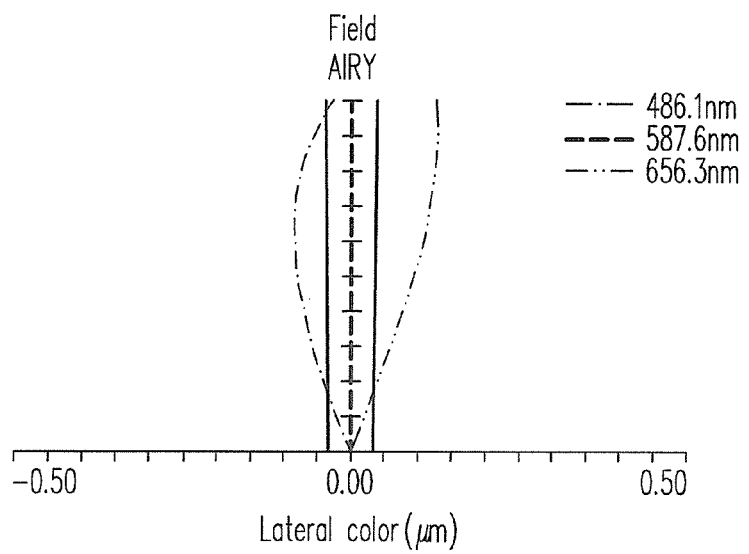

FIGS. 4A-4C are optical imaging simulation data plots of the fixed-focus lens 200 in FIG. 3. Referring to FIGS. 4A-4C, the graphs of field curvature and distortion are sequentially illustrated from left to right in FIG. 4A, the graph of spherical aberration is illustrated in FIG. 4B, and the graph of lateral color aberration is illustrated in FIG. 4C. Because the graphs illustrated in FIGS. 4A-4C are all within the specified ranges, the fixed-focus lens 200 in the present embodiment has very good imaging quality.

Third Embodiment

Figure 5:
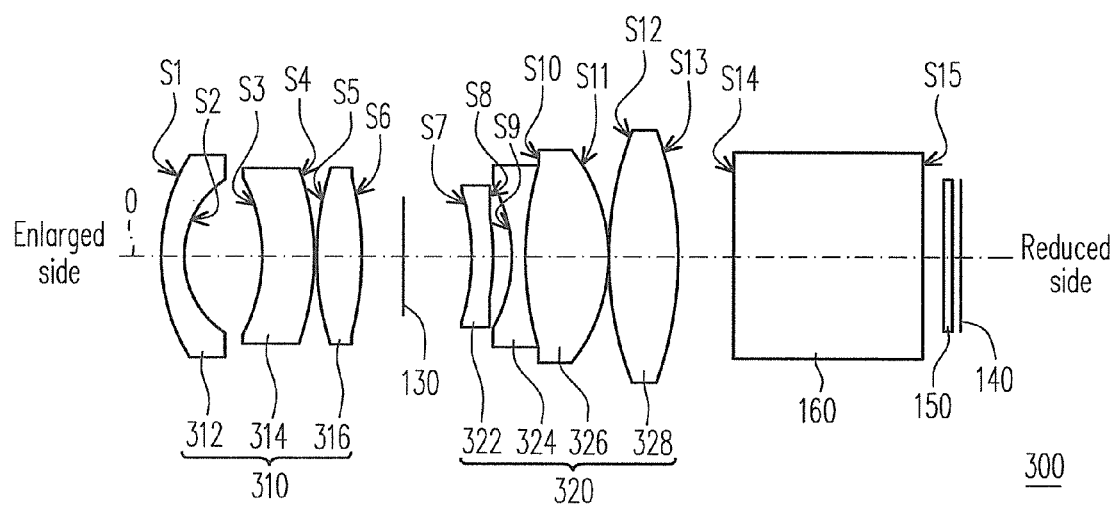
FIG. 5 is a structure diagram of a fixed-focus lens according to a third embodiment of the invention.

FIG. 5 is a structure diagram of a fixed-focus lens according to the third embodiment of the invention. Referring to FIG. 5, in the present embodiment, the fixed-focus lens 300 is disposed between an enlarged side and a reduced side and includes a first lens group 310 and a second lens group 320 sequentially arranged from the enlarged side to the reduced side. The first lens group 310 includes a lens 312, wherein the lens 312 is an aspheric lens. The second lens group 320 has a positive dioptre and is disposed between the first lens group 310 and the reduced side. The second lens group 320 includes a lens 322, wherein the lens 322 is an aspheric lens. The fixed-focus lens 300 focuses by moving the first lens group 310 and the second lens group 320.

In the present embodiment, the lens 322 has a negative dioptre, and the lens 322 is a lens in the second lens group 320 that is closest to the aperture diaphragm 130. Besides, the fixed-focus lens 300 satisfies 0.2<|f/f1|<1, 0.3<|f/f2|<1, and 1.5<L/BFL<3.5, wherein f is the focal length of the fixed-focus lens 300, f1 is the EFL of the first lens group 310, f2 is the EFL of the second lens group 320, L is the total length of the fixed-focus lens 300, and BFL is the back focal length of the fixed-focus lens 300. The lens 312 in the first lens group 310 is a meniscus lens having a convex surface facing the enlarged side, and the dioptre of the lens 312 is negative. To be specific, the EFL of the lens 312 is fasp1, and the fixed-focus lens 300 satisfies 0.5<|fasp1/f1|<3.

As shown in FIG. 5, in the present embodiment, the first lens group 310 has a positive dioptre and includes three lenses. To be specific, the first lens group 310 further includes a lens 314 and a lens 316, wherein the lens 314 and the lens 316 are disposed between the lens 312 and the second lens group 320.

On the other hand, the second lens group 220 further includes a lens 324 and a lens 326 sequentially arranged from the enlarged side to the reduced side, wherein the lens 324 and the lens 326 are disposed between the lens 322 and the reduced side. Besides, the lens 324 has a negative dioptre and the lens 326 has a positive dioptre, and the lens 324 and the lens 326 constitute a cemented doublet lens. In addition, the second lens group 320 further includes a lens 328 disposed between the lens 326 and the reduced side, wherein the dioptre of the lens 328 is positive. Accordingly, the dioptre of the lens 322, the lens 324, the lens 326, and the lens 328 are respectively negative, negative, positive, and positive.

To be specific, in the present embodiment, the lens 314 is a meniscus lens having a concave surface facing the enlarged side, and the lens 316 is a biconvex lens. The lens 322 is a meniscus lens having a concave surface facing the enlarged side, and the lens 324 is a biconcave lens. The lens 326 is a biconvex lens, and the lens 328 is a biconvex lens. Additionally, in the present embodiment, the lens 312 and the lens 322 of the fixed-focus lens 300 are aspheric lenses, and the other five lenses are all spherical lenses. The lens 312 and the lens 322 can effectively reduce the spherical aberration, coma, distortion, and astigmatism of the fixed-focus lens 300, and different dioptres combination of the lenses in the second lens group 320 can reduce the coma and distortion of the fixed-focus lens 300. On the other hand, by fabricating the lens 328 with a low-dispersion material, color aberration of the large-aperture lens can be reduced. The cemented doublet lens composed of the lens 324 and the lens 326 can reduce the spherical aberration and the color aberration.

An example of the fixed-focus lens 300 will be described below. It should be noted that the data in following table 5 is not intended to limit the scope of the invention, and those having ordinary knowledge in the art can appropriately change these parameters and settings according to the present disclosure without departing the scope and spirit of the invention.

TABLE 5

| Surface | Curvature Radius (mm) | Space (mm) | Refractive Index | Abbe Number | Note |
|---|---|---|---|---|---|
| S1 | 22.66 | 2 | 1.49 | 57.44 | Lens 312 |
| S2 | 9 | 6.76 | | | |
| S3 | −13.87 | 4.4 | 1.66 | 50.88 | Lens 314 |
| S4 | −22.9 | 0.12 | | | |
| S5 | 22.52 | 3.79 | 1.74 | 49.34 | Lens 316 |
| S6 | −31.18 | 9.54 | | | |
| S7 | −10.82 | 1.79 | 1.53, | 56.04 | Lens 322 |
| S8 | −14.75 | 1.61 | | | |
| S9 | −12.75 | 1.2 | 1.78 | 25.68 | Lens 324 |
| S10 | 28.53 | 7.14 | 1.74 | 49.34 | Lens 326 |
| S11 | −14.34 | 0.1 | | | |
| S12 | 31.02 | 5.75 | 1.62 | 63.33 | Lens 328 |
| S13 | −35.03 | 4.85 | | | |
| S14 | Infinite | 16 | 1.61 | 58.63 | Optical Element |
| S15 | Infinite | 2 | | | |

In foregoing table 5, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 5, the surface S1 is the surface of the lens 312 facing the enlarged side, and the surface S2 is the surface of the lens 312 facing the reduced side. The surfaces S3 and S4 are two surfaces of the lens 314. The surfaces S5 and S6 are two surfaces of the lens 316. The surfaces S7 and S8 are two surfaces of the lens 322. The surface S9 is the surface of the lens 324 facing the enlarged side, the surface S10 is the surface connecting the lens 324 and the lens 326, and the surface S11 is the surface of the lens 326 facing the reduced side. The surfaces S12 and S13 are two surfaces of the lens 328. The surfaces S14 and S15 are two surfaces of the optical element 160.

Moreover, the surfaces S1, S2, S7, and S8 are aspheric surfaces, and which can be expressed as:

$$Z(h) = \frac{cy^2}{1 + \sqrt{1 - (1+K)c^2 y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 5), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S7, and S8 are listed in following table 6.

TABLE 6

| Aspheric Parameter | Conic Constant K | Coefficient $A_2$ | Coefficient $A_3$ | Coefficient $A_4$ |
|---|---|---|---|---|
| S1 | 0 | 2.41E−04 | −2.69E−06 | 2.75E−08 |
| S2 | 0 | 2.85E−04 | −1.73E−06 | −3.67E−09 |

TABLE 6-continued

| | | | | |
|---|---|---|---|---|
| S7 | 0 | 8.81E-04 | -2.28E-07 | -2.19E-07 |
| S8 | 0 | 8.56E-04 | 3.29E-06 | -2.11E-07 |

| Aspheric Parameter | Conic Constant K | Coefficient A5 | Coefficient A6 |
|---|---|---|---|
| S1 | 0 | -1.45E-10 | 1.86E-13 |
| S2 | 0 | 7.61E-10 | -4.93E-12 |
| S7 | 0 | 2.53E-09 | 0 |
| S8 | 0 | 1.85E-09 | 0 |

In the present embodiment, the EFL of the fixed-focus lens 300 may be 14.94 mm, the f-number thereof may be 2, and the FOV (2ω) thereof may be 55.6°.

Figure 6A:
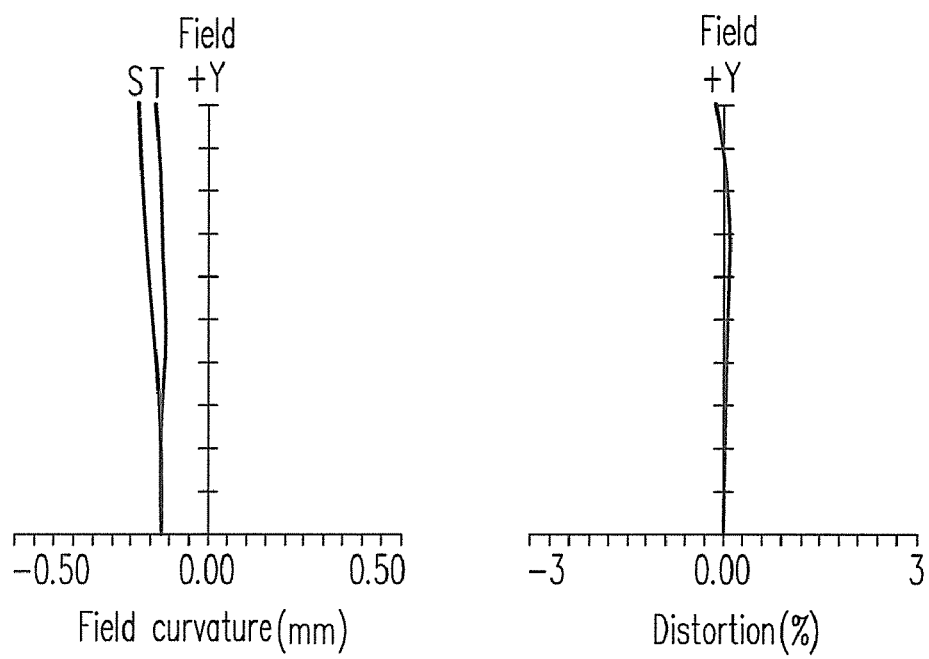
FIGS. 6A-6C are optical imaging simulation data plots of the fixed-focus lens in FIG. 5.
Figure 6B:
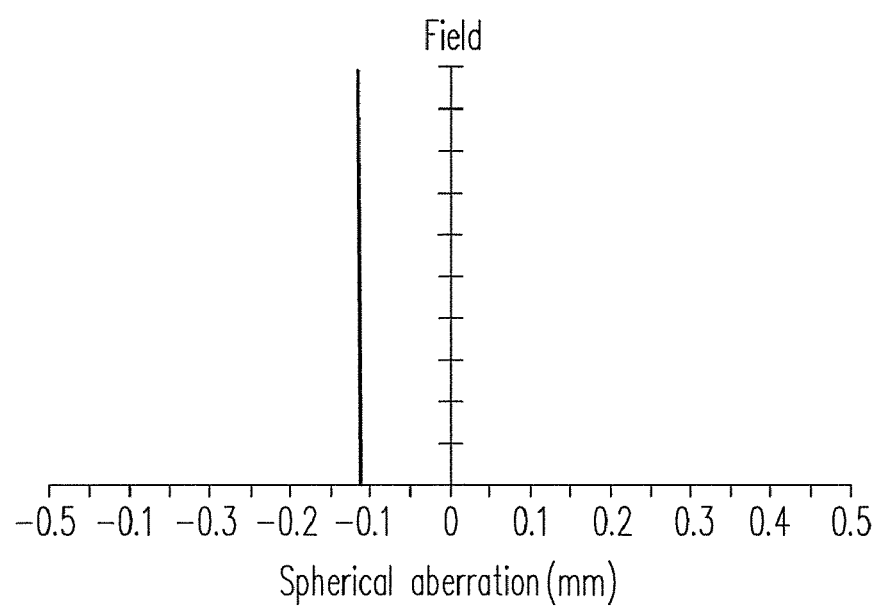
Figure 6C:
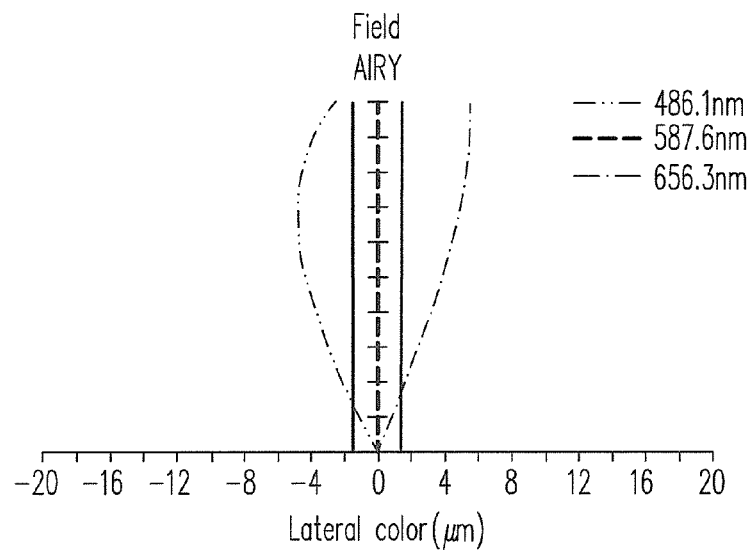

FIGS. 6A-6C are optical imaging simulation data plots of the fixed-focus lens 300 in FIG. 5. Referring to FIGS. 6A-6C, the graphs of field curvature and distortion are sequentially illustrated from left to right in FIG. 6A, the graph of spherical aberration is illustrated in FIG. 6B, and the graph of lateral color aberration is illustrated in FIG. 6C. The graphs illustrated in FIGS. 6A-6C indicate that the fixed-focus lens 300 in the present embodiment has very good imaging quality.

Fourth Embodiment

Figure 7:
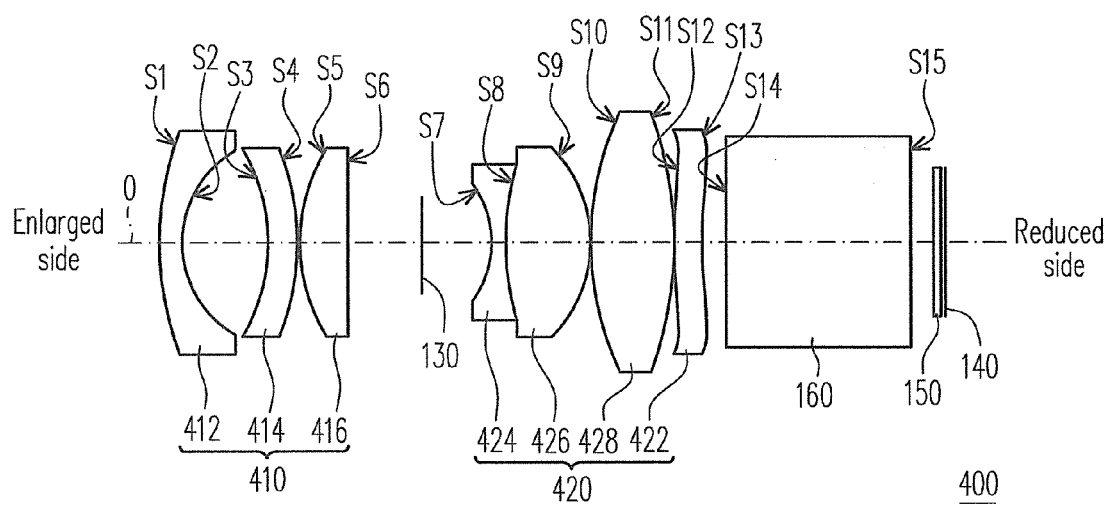
FIG. 7 is a structure diagram of a fixed-focus lens according to a fourth embodiment of the invention.

FIG. 7 is a structure diagram of a fixed-focus lens according to the fourth embodiment of the invention. Referring to FIG. 7, in the present embodiment, the fixed-focus lens 400 is disposed between an enlarged side and a reduced side and includes a first lens group 410 and a second lens group 420 sequentially arranged from the enlarged side to the reduced side. The first lens group 410 includes a lens 412, wherein the lens 412 is an aspheric lens. The second lens group 420 has a positive dioptre and is disposed between the first lens group 410 and the reduced side. The second lens group 420 includes a lens 422, wherein the lens 422 is an aspheric lens. The fixed-focus lens 400 focuses by moving the first lens group 410 and the second lens group 420.

In the present embodiment, the lens 422 has a positive dioptre, and the lens 422 is a lens in the second lens group 420 that is farthest from the aperture diaphragm 130. Besides, the fixed-focus lens 400 satisfies $0.1<|f/f1|<1$, $0.2<|f/f2|<1.5$, and $1.8<L/BEL<3.5$, wherein f is the focal length of the fixed-focus lens 400, f1 is the EFL of the first lens group 410, f2 is the EFL of the second lens group 420, L is the total length of the fixed-focus lens 400, and BFL is the back focal length of the fixed-focus lens 400. In addition, the lens 412 in the first lens group 410 is a meniscus lens having its convex surface facing the enlarged side, and the dioptre of the lens 412 is negative. To be specific, the EFL of the lens 412 is fasp1, and the fixed-focus lens 400 satisfies $0.1<|fasp1/f1|<11$.

As shown in FIG. 7, in the present embodiment, the first lens group 410 has a positive dioptre and includes three lenses. To be specific, the first lens group 410 further includes a lens 414 and a lens 416, wherein the lens 414 and the lens 416 are disposed between the lens 412 and the second lens group 420. However, in other embodiments, the lens 412 may also be disposed between the lens 414 and the lens 416. Namely, the lens 412 may be the first or second lens from the enlarged side in the first lens group 410.

On the other hand, the second lens group 420 further includes a lens 424 and a lens 426 sequentially arranged from the enlarged side to the reduced side. The lens 424 and the lens 426 are disposed between the aperture diaphragm 130 and the lens 422. In addition, the dioptre of the lens 424 is negative and the dioptre of the lens 426 is positive, and the lens 424 and the lens 426 constitute a cemented doublet lens.

Moreover, the second lens group 420 further includes a lens 428 disposed between the lens 426 and the lens 422, and the dioptre of the lens 428 is positive. Accordingly, the dioptres of the lens 424, the lens 426, the lens 428, and the lens 422 are respectively negative, positive, positive, and positive.

To be specific, in the present embodiment, the lens 414 is a meniscus lens having a concave surface facing the enlarged side, and the lens 416 is a biconvex lens. The lens 424 is a biconcave lens, the lens 426 is a biconvex lens, and the lens 428 is a biconvex lens. Besides, in the present embodiment, the lens 412 and the lens 422 of the fixed-focus lens 400 are aspheric lenses, and the other five lenses are all spherical lenses. The lens 412 and the lens 422 can effectively reduce the spherical aberration, coma, distortion, and astigmatism of the fixed-focus lens 400, and different dioptres combination of the lenses in the second lens group 420 can reduce the coma and distortion of the fixed-focus lens 400. On the other hand, by fabricating the lenses 414 and 426 with a low-dispersion material, color aberration of the large-aperture lens can be reduced. The cemented doublet lens composed of the lens 424 and the lens 426 can reduce the spherical aberration and the color aberration. Color aberration can be effectively reduced by fabricating one of the lens 424 and the lens 426 (for example, the lens 426) with a low-dispersion material.

An example of the fixed-focus lens 400 will be described below. It should be noted that the data in following table 7 is not intended to limit the scope of the invention, and those having ordinary knowledge in the art can appropriately change these parameters and settings according to the present disclosure without departing the scope and spirit of the invention.

TABLE 7

| Surface | Curvature Radius (mm) | Space (mm) | Refractive Index | Abbe Number | Note |
|---|---|---|---|---|---|
| S1 | 43.2 | 1.86 | 1.49 | 57.44 | Lens 412 |
| S2 | 10 | 7.43 | | | |
| S3 | -18 | 2.62 | 1.49 | 70.24 | Lens 414 |
| S4 | -23.52 | 0.1 | | | |
| S5 | 15.74 | 4.21 | 1.79 | 44.2 | Lens 416 |
| S6 | -1296.7 | 12.66 | | | |
| S7 | -9.07 | 1.19 | 1.76 | 26.52 | Lens 424 |
| S8 | 25.74 | 7.13 | 1.62 | 63.33 | Lens 426 |
| S9 | -13.12 | 0.1 | | | |
| S10 | 25.26 | 7.23 | 1.74 | 49.34 | Lens 428 |
| S11 | -36.53 | 0.1 | | | |
| S12 | 35 | 2.61 | 1.53 | 56.04 | Lens 422 |
| S13 | 52.1 | 2 | | | |
| S14 | Infinite | 16 | 1.61 | 58.63 | Optical Element |
| S15 | Infinite | 2 | | | |

In foregoing table 7, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 7, the surface S1 is the surface of the lens 412 facing the enlarged side, and the surface S2 is the surface of the lens 412 facing the reduced side. The surfaces S3 and S4 are two surfaces of the lens 414. The surfaces S5 and S6 are two surfaces of the lens 416. The surface S7 is the surface of the lens 424 facing the enlarged side, the surface S8 is the surface connecting the lens 424 and the lens 426, and the surface S9 is the surface of the lens 426 facing the reduced side. The surfaces S10 and S11 are two surfaces of the lens 428. The surfaces S12 and S13 are two surfaces of the lens 422. The surfaces S14 and S15 are two surfaces of the optical element 160.

Moreover, the surfaces S1, S2, S12, and S13 are aspheric surfaces, and which can be expressed as:

$$Z(h) = \frac{cy^2}{1+\sqrt{1-(1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 7), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S12, and S13 are listed in following table 8.

TABLE 8

| Aspheric Parameter | Conic Constant K | Coefficient $A_2$ | Coefficient $A_3$ | Coefficient $A_4$ |
|---|---|---|---|---|
| S1 | 0 | 1.87E−04 | −2.96E−06 | 2.93E−08 |
| S2 | 0 | 1.65E−04 | −2.79E−06 | −7.98E−09 |
| S12 | 0 | −6.23E−05 | −1.00E−06 | 9.89E−10 |
| S13 | 0 | −1.97E−05 | −1.37E−06 | 5.62E−09 |

| Aspheric Parameter | Conic Constant K | Coefficient A5 | Coefficient A6 |
|---|---|---|---|
| S1 | 0 | −1.57E−10 | 3.43E−13 |
| S2 | 0 | 5.03E−10 | −4.48E−12 |
| S12 | 0 | 1.31E−11 | 0 |
| S13 | 0 | −2.61E−12 | 0 |

In the present embodiment, the EFL of the fixed-focus lens 400 may be 14.74 mm, the f-number thereof may be 2, and the FOV (2ω) thereof may be 55.6°.

Figure 8A:
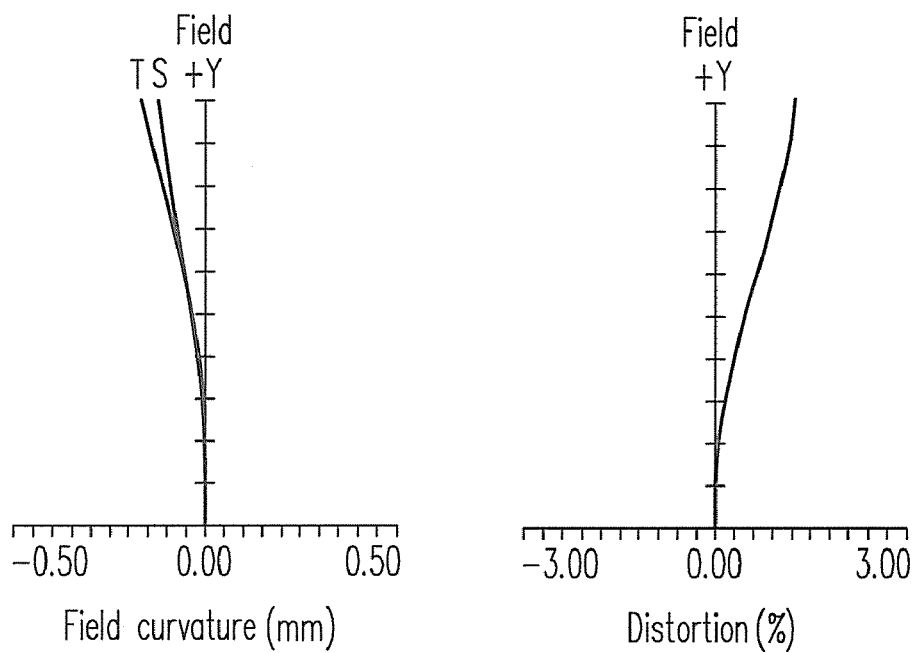
FIGS. 8A-8C are optical imaging simulation data plots of the fixed-focus lens in FIG. 7.
Figure 8B:
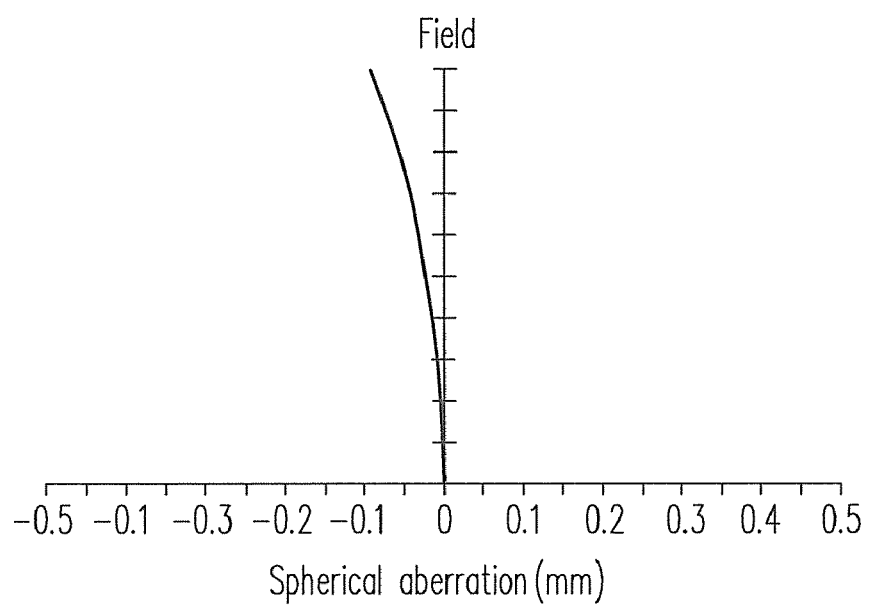
Figure 8C:
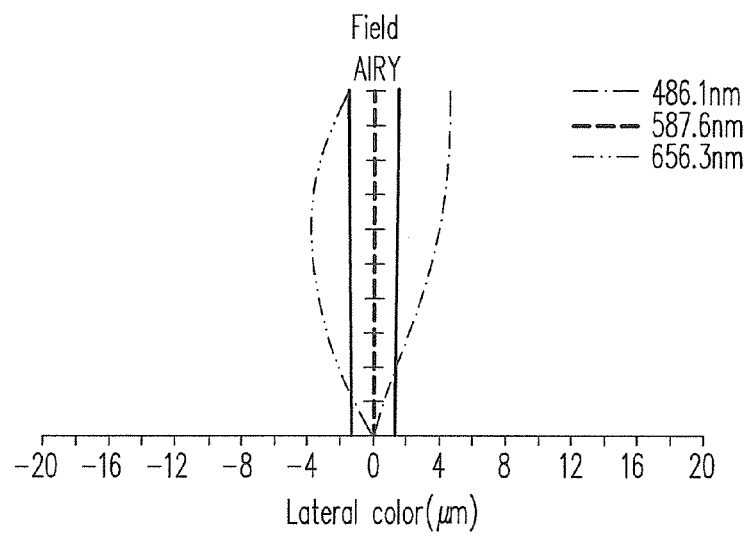

FIGS. 8A-8C are optical imaging simulation data plots of the fixed-focus lens 400 in FIG. 7. Referring to FIGS. 8A-8C, the graphs of field curvature and distortion are sequentially illustrated from left to right in FIG. 8A, the graph of spherical aberration is illustrated in FIG. 8B, and the graph of lateral color aberration is illustrated in FIG. 8C. The graphs illustrated in FIGS. 8A-8C indicate that the fixed-focus lens 400 in the present embodiment has very good imaging quality.

Fifth Embodiment

Figure 9:
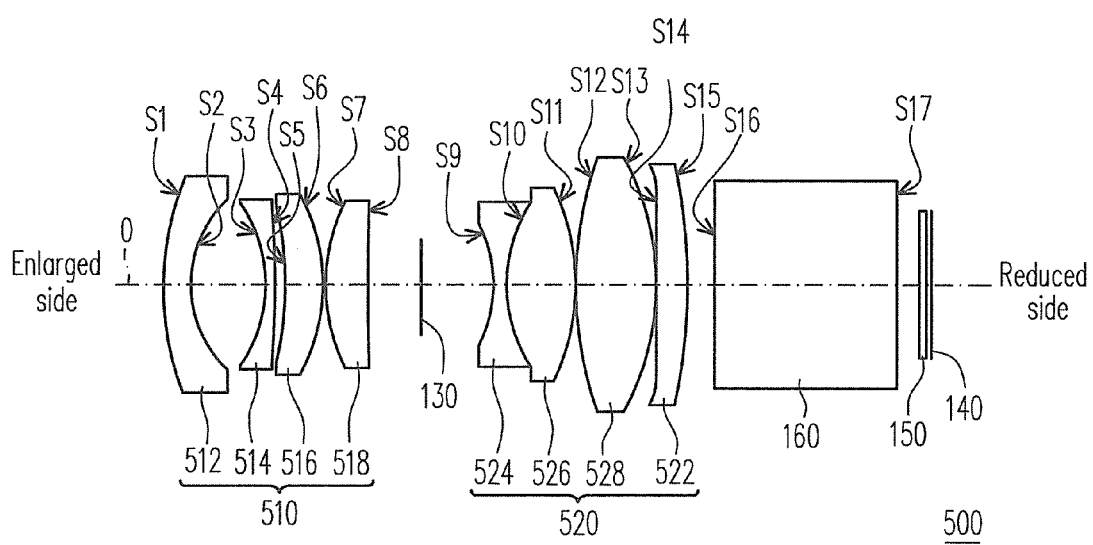
FIG. 9 is a structure diagram of a fixed-focus lens according to a fifth embodiment of the invention.

FIG. 9 is a structure diagram of a fixed-focus lens according to the fifth embodiment of the invention. Referring to FIG. 9, in the present embodiment, the fixed-focus lens 500 is disposed between an enlarged side and a reduced side and includes a first lens group 510 and a second lens group 520 sequentially arranged from the enlarged side to the reduced side. The first lens group 510 includes a lens 512, wherein the lens 512 is an aspheric lens. The second lens group 520 has a positive dioptre and is disposed between the first lens group 510 and the reduced side. The second lens group 520 includes a lens 522, wherein the lens 522 is an aspheric lens. The fixed-focus lens 500 focuses by moving the first lens group 510 and the second lens group 520.

In the present embodiment, the lens 522 has a positive dioptre, and the lens 522 is a lens in the second lens group 520 that is farthest from the aperture diaphragm 130. Besides, the fixed-focus lens 500 satisfies 0.1<|f/f1|<1, 0.2<|f/f2|<1.5, and 1.8<L/BEL<3.5, wherein f is the focal length of the fixed-focus lens 500, f1 is the EFL of the first lens group 510, f2 is the EFL of the second lens group 520, L is the total length of the fixed-focus lens 500, and BFL is the back focal length of the fixed-focus lens 500. In addition, the lens 512 in the first lens group 510 is a meniscus lens having a convex surface facing the enlarged side, and the dioptre of the lens 512 is negative. To be specific, the EFL of the lens 512 is fasp1, and the fixed-focus lens 500 satisfies 0.1<|fasp1/f1|<11.

As shown in FIG. 9, in the present embodiment, the first lens group 510 has a positive dioptre, and the first lens group 510 includes four lenses. To be specific, the first lens group 510 further includes a lens 514, a lens 516, and a lens 518 sequentially arranged from the enlarged side to the reduced side, wherein the lens 514, the lens 516, and the lens 518 are disposed between the lens 512 and the second lens group 520. However, in other embodiments, the lens 512 may also be disposed between the lens 514 and the lens 516. Namely, the lens 512 may be the first or second lens from the enlarged side in the first lens group 510.

On the other hand, the second lens group 520 further includes a lens 524 and a lens 526 sequentially arranged from the enlarged side to the reduced side. The lens 524 and the lens 526 are disposed between the aperture diaphragm 130 and the lens 522. In addition, the dioptres of the lens 524 is negative and the dioptres of the lens 526 is positive, and the lens 524 and the lens 526 constitute a cemented doublet lens. Moreover, the second lens group 520 further includes a lens 528 disposed between the lens 526 and the lens 522, and the dioptre of the lens 528 is positive. Accordingly, the dioptres of the lens 524, the lens 526, the lens 528, and the lens 522 are respectively negative, positive, positive, and positive.

To be specific, in the present embodiment, the lens 514 is a meniscus lens having a concave surface facing the enlarged side, the lens 516 is a meniscus lens having a concave surface facing the enlarged side, and the lens 518 is a meniscus lens having a convex surface facing the enlarged side. The lens 524 is a biconcave lens, the lens 526 is a biconvex lens, and the lens 528 is a biconvex lens. Besides, in the present embodiment, the lens 512 and the lens 522 of the fixed-focus lens 500 are aspheric lenses, and the other six lenses are all spherical lenses. The lens 512 and the lens 522 can effectively reduce the spherical aberration, coma, distortion, and astigmatism of the fixed-focus lens 500, and different dioptres combination of the lenses in the second lens group 520 can reduce the coma and distortion of the fixed-focus lens 500. On the other hand, by fabricating the lens 526 with a low-dispersion material, color aberration of the large-aperture lens can be reduced. The cemented doublet lens composed of the lens 524 and the lens 526 can reduce the spherical aberration and the color aberration. Color aberration can be effectively reduced by fabricating one of the lens 524 and the lens 526 (for example, the lens 526) with a low-dispersion material.

An example of the fixed-focus lens 500 will be described below. It should be noted that the data in following table 9 is not intended to limit the scope of the invention, and those having ordinary knowledge in the art can appropriately change these parameters and settings according to the present disclosure without departing the scope and spirit of the invention.

TABLE 9

| Surface | Curvature Radius (mm) | Space (mm) | Refractive Index | Abbe Number | Note |
|---|---|---|---|---|---|
| S1 | 34 | 2.5 | 1.49 | 57.44 | Lens 512 |
| S2 | 10.65 | 6.385 | | | |
| S3 | −13.95 | 1 | 1.73 | 28.53 | Lens 514 |
| S4 | −139.5 | 0.739 | | | |
| S5 | −40.1 | 3.39 | 1.83 | 37.3 | Lens 516 |
| S6 | −16.201 | 0.12 | | | |
| S7 | 15.465 | 3.805 | 1.83 | 37.3 | Lens 518 |
| S8 | 154.696 | 11.142 | | | |
| S9 | −10.688 | 1 | 1.76 | 23.38 | Lens 524 |
| S10 | 13.516 | 5.917 | 1.60 | 61.27 | Lens 526 |
| S11 | −19.8 | 0.12 | | | |
| S12 | 32.5 | 6.798 | 1.77 | 49.62 | Lens 528 |
| S13 | −22.58 | 0.12 | | | |
| S14 | 133.359 | 2.591 | 1.53 | 56.04 | Lens 522 |
| S15 | −66.584 | 2 | | | |
| S16 | Infinite | 16 | 1.61 | 58.63 | Optical Element |
| S17 | Infinite | 2 | | | |

In foregoing table 9, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 9, the surface S1 is the surface of the lens 512 facing the enlarged side, and the surface S2 is the surface of the lens 512 facing the reduced side. The surfaces S3 and S4 are two surfaces of the lens 514. The surfaces S5 and S6 are two surfaces of the lens 516. The surfaces S7 and S8 are two surfaces of the lens 518. The surface S9 is the surface of the lens 524 facing the enlarged side, the surface S10 is the surface connecting the lens 524 and the lens 526, and the surface S11 is the surface of the lens 526 facing the reduced side. The surfaces S12 and S13 are two surfaces of the lens 528. The surfaces S14 and S15 are two surfaces of the lens 522. The surfaces S16 and S17 are two surfaces of the optical element 160.

Moreover, the surfaces S1, S2, S14, and S15 are aspheric surfaces, and which can be expressed as:

$$Z(h) = \frac{cy^2}{1 + \sqrt{1 - (1+K)c^2 y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 9), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$, $A_6$, and $A_7$ are 0. Parameters of the surfaces S1, S2, S14, and S15 are listed in following table 10.

TABLE 10

| Aspheric Parameter | Conic Constant K | Coefficient $A_2$ | Coefficient $A_3$ | Coefficient $A_4$ | Coefficient $A_5$ |
|---|---|---|---|---|---|
| S1 | 0 | 1.26E−04 | −1.195E−06 | 6.7E−09 | −1.250E−11 |
| S2 | 0 | 1.22E−04 | −1.250E−06 | −4.5E−09 | 8.318E−11 |
| S14 | 0 | −3.775E−05 | −1.647E−07 | −5.75E−09 | 3.073E−11 |
| S15 | 0 | 3.59E−05 | −2.811E−07 | −4.788E−09 | 2.916E−11 |

In the present embodiment, the EFL of the fixed-focus lens 500 may be 14.69 mm, the f-number thereof may be 2, and the FOV (2ω) thereof may be 55.6°.

Figure 10A:
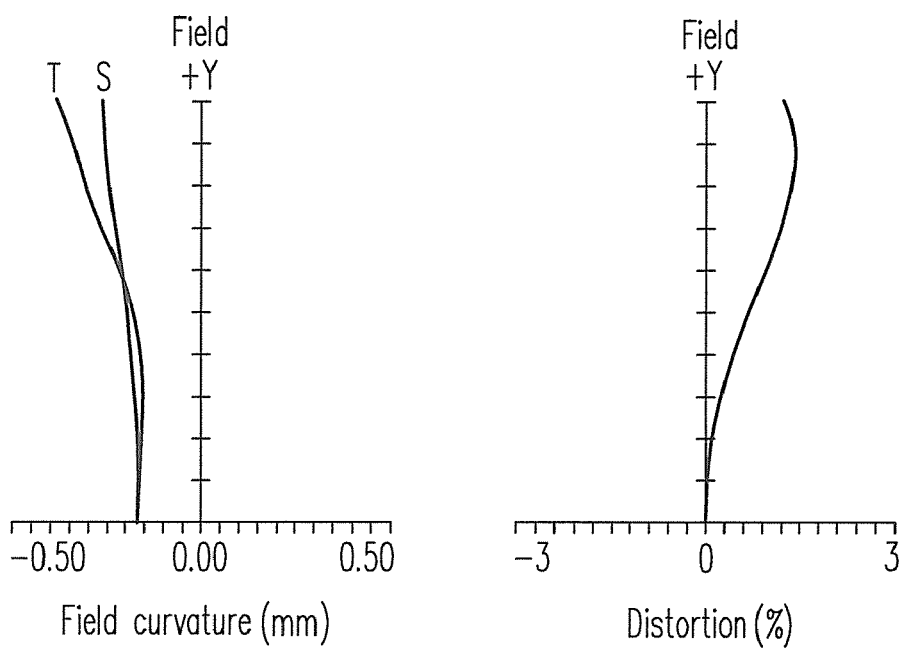
FIGS. 10A-10C are optical imaging simulation data plots of the fixed-focus lens in FIG. 9.
Figure 10B:
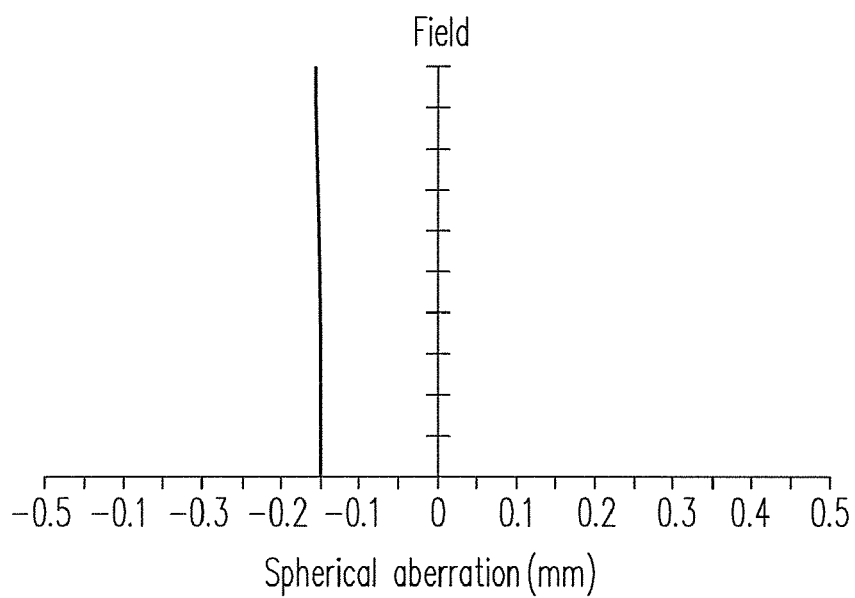
Figure 10C:
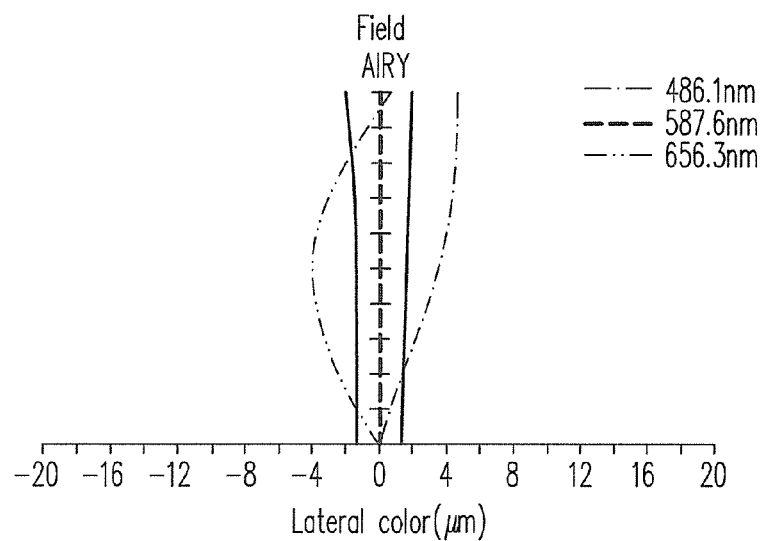

FIGS. 10A-10C are optical imaging simulation data plots of the fixed-focus lens 500 in FIG. 9. Referring to FIGS. 10A-10C, the graphs of field curvature and distortion are sequentially illustrated from left to right in FIG. 10A, the graph of spherical aberration is illustrated in FIG. 10B, and the graph of lateral color aberration is illustrated in FIG. 10C. The graphs illustrated in FIGS. 10A-10C indicate that the fixed-focus lens 500 in the present embodiment has very good imaging quality.

Sixth Embodiment

Figure 11:
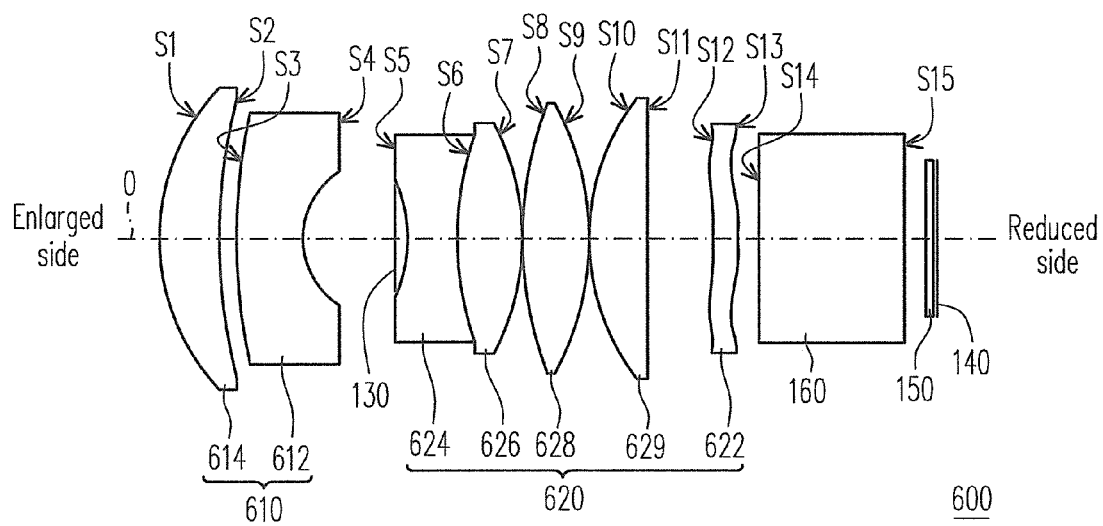
FIG. 11 is a structure diagram of a fixed-focus lens according to a sixth embodiment of the invention.

FIG. 11 is a structure diagram of a fixed-focus lens according to the sixth embodiment of the invention. Referring to FIG. 11, in the present embodiment, the fixed-focus lens 600 is disposed between an enlarged side and a reduced side and includes a first lens group 610 and a second lens group 620 sequentially arranged from the enlarged side to the reduced side. The first lens group 610 includes a lens 612, wherein the lens 612 is an aspheric lens. The second lens group 620 has a positive dioptre and is disposed between the first lens group 610 and the reduced side. The second lens group 620 includes a lens 622, wherein the lens 622 is an aspheric lens. The fixed-focus lens 600 focuses by moving the first lens group 610 and the second lens group 620.

In the present embodiment, the lens 622 has a positive dioptre, and the lens 622 is a lens in the second lens group 620 that is farthest from the aperture diaphragm 130. Besides, the fixed-focus lens 600 satisfies 0.1<|f/f1|<1, 0.2<|f/f2|<1.5, and 1.8<L/BEL<3.5, wherein f is the focal length of the fixed-focus lens 600, f1 is the EFL of the first lens group 610, f2 is the EFL of the second lens group 620, L is the total length of the fixed-focus lens 600, and BFL is the back focal length of the fixed-focus lens 600. In addition, the lens 612 in the first lens group 610 is a meniscus lens having a convex surface facing the enlarged side, and the dioptre of the lens 612 is negative.

To be specific, the EFL of the lens 612 is fasp1, and the fixed-focus lens 600 satisfies 0.1<|fasp1/f1|<11.

As shown in FIG. 11, in the present embodiment, the first lens group 610 has a negative dioptre and includes two lenses. To be specific, the first lens group 610 further includes a lens 614, wherein the lens 612 is disposed between the lens 614 and the second lens group 620. However, in other embodiments, the lens 614 may also be disposed between the lens 612 and the second lens group 620. Namely, the aspheric lens (i.e., the lens 612) may be the second or first lens from the enlarged side in the first lens group 610.

On the other hand, the second lens group 620 further includes a lens 624 and a lens 626 sequentially arranged from the enlarged side to the reduced side. The lens 624 and the lens 626 are disposed between the aperture diaphragm 130 and the lens 622. Besides, the dioptre of the lens 624 is negative and the dioptres of the lens 626 is positive, and the lens 624 and the lens 626 constitute a cemented doublet lens. In addition, the second lens group 620 further includes a lens 628 and a lens 629. The lens 628 and the lens 629 are disposed between the lens 626 and the lens 622, and the dioptres of the lens 628 and the lens 629 are both positive. Accordingly, the dioptres of the lens 624, the lens 626, the lens 628, the lens 629, and the lens 622 are respectively negative, positive, positive, positive, and positive.

To be specific, in the present embodiment, the lens 614 is a meniscus lens having a convex surface facing the enlarged side. The lens 624 is a biconcave lens, the lens 626 is a biconvex lens, the lens 628 is a biconvex lens, and the lens 629 is a biconvex lens. Besides, in the present embodiment, the lens 612 and the lens 622 of the fixed-focus lens 600 are aspheric lenses, and the other five lenses are all spherical lenses. The lens 612 and the lens 622 can effectively reduce the spherical aberration, coma, distortion, and astigmatism of the fixed-focus lens 600, and different dioptres combination of the lenses in the second lens group 620 can reduce the coma and distortion of the fixed-focus lens 600. On the other hand, by fabricating the lens 628 or 629 with a low-dispersion material, color aberration of the large-aperture lens can be reduced. The cemented doublet lens composed of the lens 624 and the lens 626 can reduce the spherical aberration and the color aberration.

An example of the fixed-focus lens 600 will be described below. It should be noted that the data in following table 11 is not intended to limit the scope of the invention, and those having ordinary knowledge in the art can appropriately change these parameters and settings according to the present disclosure without departing the scope and spirit of the invention.

TABLE 11

| Surface | Curvature Radius (mm) | Space (mm) | Refractive Index | Abbe Number | Note |
|---|---|---|---|---|---|
| S1 | 22.585 | 5.82 | 1.8 | 34.97 | Lens 614 |
| S2 | 58.496 | 1.727 | | | |
| S3 | 78.774 | 6.471 | 1.49 | 57.44 | Lens 612 |
| S4 | 8.321 | 10.204 | | | |
| S5 | −15.441 | 4.833 | 1.76 | 23.38 | Lens 624 |
| S6 | 32.560 | 6.178 | 1.77 | 49.62 | Lens 626 |
| S7 | −25.830 | 0.12 | | | |
| S8 | 37.206 | 6.516 | 1.5 | 81.61 | Lens 628 |
| S9 | −28.506 | 0.12 | | | |
| S10 | 23.477 | 5.689 | 1.49 | 70.24 | Lens 629 |
| S11 | −593.285 | 6.323 | | | |
| S12 | −50.305 | 2.5 | 1.53 | 56.04 | Lens 622 |
| S13 | −22.374 | 2.325 | | | |
| S14 | Infinite | 14 | 1.52 | 64.17 | Optical Element |
| S15 | Infinite | 2 | | | |

In foregoing table 11, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 11, the surface S1 is the surface of the lens 614 facing the enlarged side, and the surface S2 is the surface of the lens 614 facing the reduced side. The surfaces S3 and S4 are two surfaces of the lens 612. The surface S5 is the surface of the lens 624 facing the enlarged side, the surface S6 is the surface connecting the lens 624 and the lens 626, and the surface S7 is the surface of the lens 626 facing the reduced side. The surfaces S8 and S9 are two surfaces of the lens 628. The surfaces S10 and S11 are two surfaces of the lens 629. The surfaces S12 and S13 are two surfaces of the lens 622. The surfaces S14 and S15 are two surfaces of the optical element 160.

Moreover, the surfaces S3, S4, S12, and S13 are aspheric surfaces, and which can be expressed as:

$$Z(h) = \frac{cy^2}{1 + \sqrt{1-(1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 11), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficient $A_1$ is 0. Parameters of the surfaces S3, S4, S12, and S13 are listed in following table 12.

TABLE 12

| Aspheric Parameter | Conic Constant K | Coefficient $A_2$ | Coefficient $A_3$ | Coefficient $A_4$ |
|---|---|---|---|---|
| S3 | 0 | 3.795E−05 | −3.22E−07 | 2.262E−09 |
| S4 | 0 | 8.107E−05 | −2.526E−07 | −1.751E−08 |
| S12 | 0 | 6.678E−05 | 6.374E−07 | 4.733E−09 |
| S13 | 0 | 1.749E−04 | 2.864E−07 | 1.478E−08 |

| Aspheric Parameter | Conic Constant K | Coefficient A5 | Coefficient A6 | Coefficient A7 |
|---|---|---|---|---|
| S3 | 0 | −1.222E−11 | 4.09E−14 | −5.972E−17 |
| S4 | 0 | 1.021E−09 | −2.439E−11 | 2.189E−13 |
| S12 | 0 | −1.538E−10 | 1.011E−12 | −2.958E−15 |
| S13 | 0 | −2.429E−10 | 1.44E−12 | −4.564E−15 |

In the present embodiment, the EFL of the fixed-focus lens 600 may be 17.95 mm, the f-number thereof may be 1.5, and the FOV (2ω) thereof may be 46.2°.

Figure 12A:
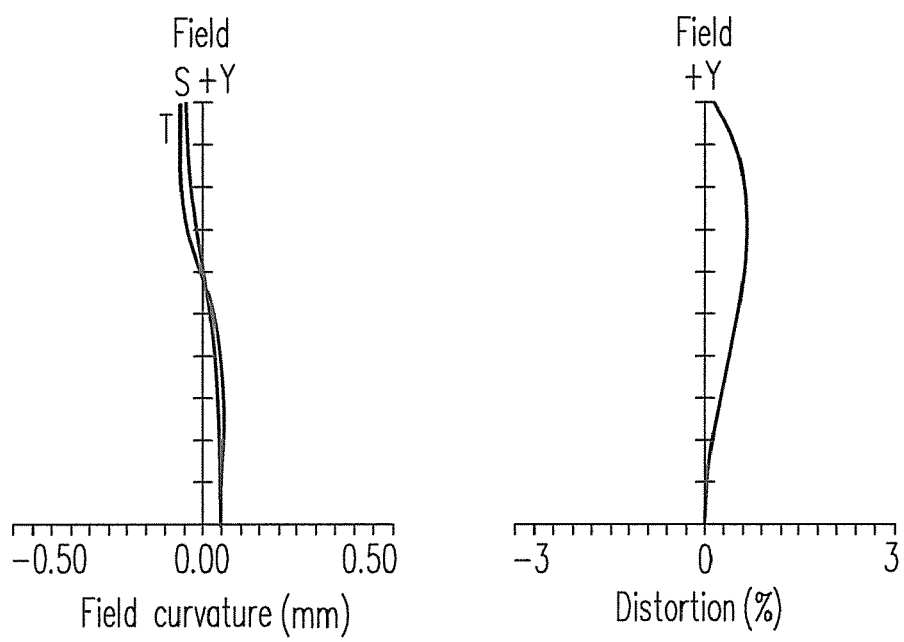
FIGS. 12A-12C are optical imaging simulation data plots of the fixed-focus lens in FIG. 11.
Figure 12B:
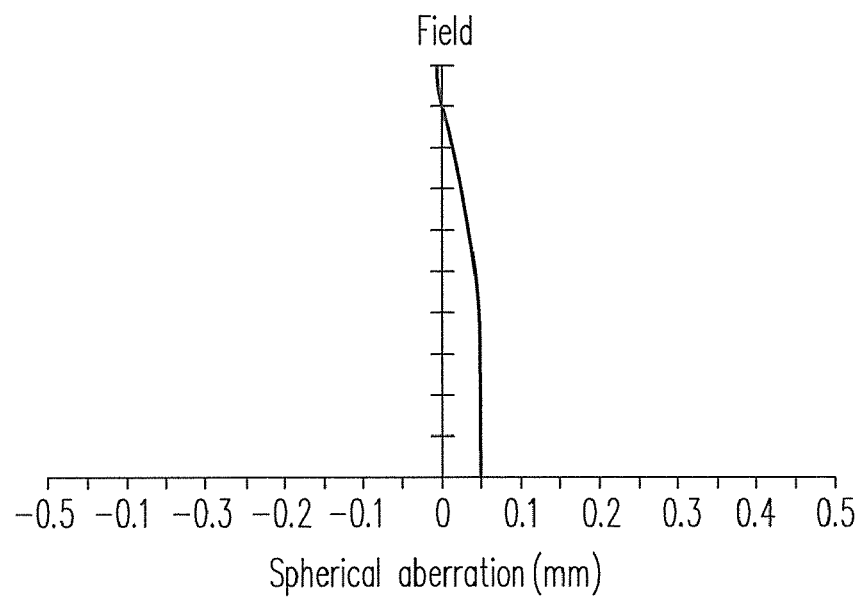
Figure 12C:
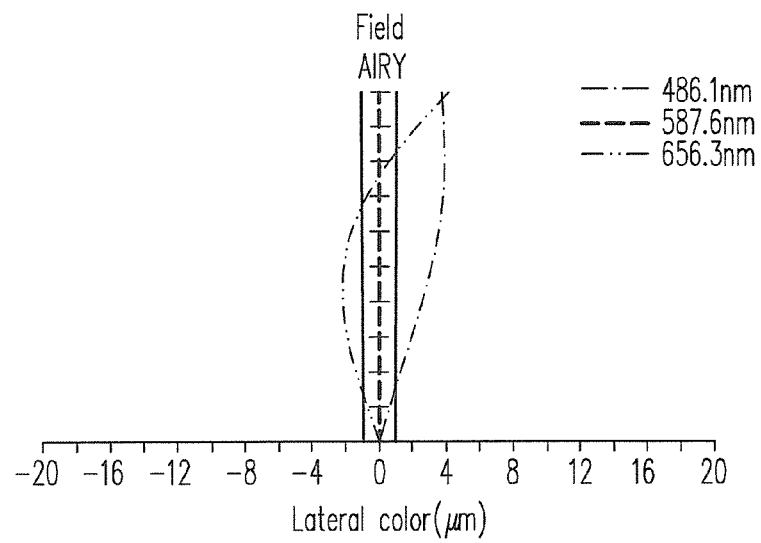

FIGS. 12A-12C are optical imaging simulation data plots of the fixed-focus lens 600 in FIG. 11. Referring to FIGS. 12A-12C, the graphs of field curvature and distortion are sequentially illustrated from left to right in FIG. 12A, the graph of spherical aberration is illustrated in FIG. 12B, and the graph of lateral color aberration is illustrated in FIG. 12C. The graphs illustrated in FIGS. 12A-12C indicate that the fixed-focus lens 600 in the present embodiment has very good imaging quality.

Seventh Embodiment

Figure 13:
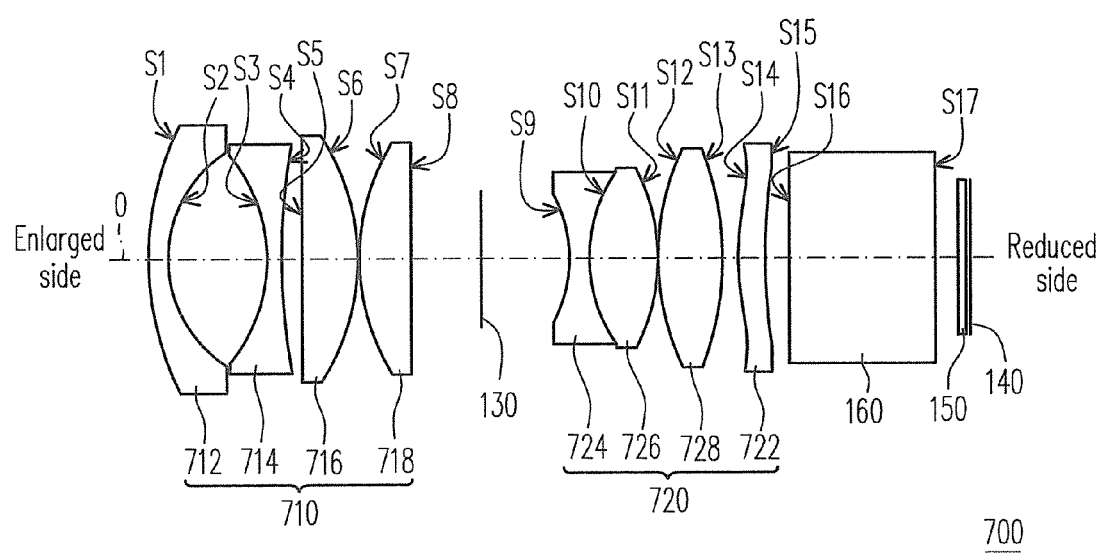
FIG. 13 is a structure diagram of a fixed-focus lens according to a seventh embodiment of the invention.

FIG. 13 is a structure diagram of a fixed-focus lens according to the seventh embodiment of the invention. Referring to FIG. 13, in the present embodiment, the fixed-focus lens 700 is disposed between an enlarged side and a reduced side and includes a first lens group 710 and a second lens group 720 sequentially arranged from the enlarged side to the reduced side. The first lens group 710 includes a lens 712, wherein the lens 712 is an aspheric lens. The second lens group 720 has a positive dioptre and is disposed between the first lens group 710 and the reduced side. The second lens group 720 includes a lens 722, wherein the lens 722 is an aspheric lens. The fixed-focus lens 700 focuses by moving the first lens group 710 and the second lens group 720.

In the present embodiment, the lens 722 has a positive dioptre, and the lens 722 is a lens in the second lens group 720 that is farthest from the aperture diaphragm 130. Besides, the fixed-focus lens 700 satisfies 0.1<|f/f1|<1, 0.2<|f/f2|<1.5, and 1.8<L/BFL<3.5, wherein f is the focal length of the fixed-focus lens 700, f1 is the EFL of the first lens group 710, f2 is the EFL of the second lens group 720, L is the total length of the fixed-focus lens 700, and BFL is the back focal length of the fixed-focus lens 700. In addition, the lens 712 in the first lens group 710 is a meniscus lens having its convex surface facing the enlarged side, and the dioptre of the lens 712 is negative. To be specific, the EFL of the lens 712 is fasp1, and the fixed-focus lens 700 satisfies 0.1<|fasp1/f1|<11.

As shown in FIG. 13, in the present embodiment, the first lens group 710 has a positive dioptre and includes four lenses. To be specific, the first lens group 710 further includes a lens 714, a lens 716, and a lens 718 sequentially arranged from the enlarged side to the reduced side, wherein the lens 714, the lens 716, and the lens 718 are disposed between the lens 712 and the second lens group 720.

On the other hand, the second lens group 720 further includes a lens 724 and a lens 726 sequentially arranged from the enlarged side to the reduced side. The lens 724 and the lens 726 are disposed between the first lens group 710 and the lens 722. The dioptre of the lens 724 is negative and the dioptre of the lens 726 is positive, and the lens 724 and the lens 726 constitute a cemented doublet lens. In addition, the second lens group 720 further includes a lens 728 disposed between the lens 726 and the lens 722, and the dioptre of the lens 728 is positive. Accordingly, the dioptres of the lens 724, the lens 726, the lens 728, and the lens 722 are respectively negative, positive, positive, and positive.

To be specific, in the present embodiment, the lens 714 is a biconcave lens, the lens 716 is a meniscus lens having a concave surface facing the enlarged side, and the lens 718 is a plano-convex lens having a convex surface facing the enlarged side. The lens 724 is a biconcave lens, the lens 726 is a biconvex lens, and the lens 728 is a biconvex lens. Additionally, in the present embodiment, the lens 712 and the lens 722 of the fixed-focus lens 700 are aspheric lenses, and the other six lenses are all spherical lenses. The lens 712 and the lens 722 can effectively reduce the spherical aberration, coma, distortion, and astigmatism of the fixed-focus lens 700, and different dioptres combination of the lenses in the second lens group 720 can reduce the coma and distortion of the fixed-focus lens 700. On the other hand, by fabricating the lens 726 with a low-dispersion material, color aberration of the large-aperture lens can be reduced. The cemented doublet lens composed of the lens 724 and the lens 726 can reduce the spherical aberration and the color aberration. Color aberration can be effectively reduced by fabricating one of the lens 724 and the lens 726 (for example, the lens 726) with a low-dispersion material.

An example of the fixed-focus lens 700 will be described below. It should be noted that the data in following table 13 is not intended to limit the scope of the invention, and those having ordinary knowledge in the art can appropriately change these parameters and settings according to the present disclosure without departing the scope and spirit of the invention.

TABLE 13

| Surface | Curvature Radius (mm) | Space (mm) | Refractive Index | Abbe Number | Note |
|---|---|---|---|---|---|
| S1 | 44.5 | 1.87 | 1.49 | 57.44 | Lens 712 |
| S2 | 12.75 | 10.01 | | | |
| S3 | −18.6 | 1.51 | 1.7 | 30.13 | Lens 714 |
| S4 | 62.58 | 2.19 | | | |
| S5 | −1256 | 5.67 | 1.79 | 44.2 | Lens 716 |
| S6 | −23.69 | 0.12 | | | |
| S7 | 23 | 5.39 | 1.8 | 34.97 | Lens 718 |
| S8 | Infinite | 15.86 | | | |
| S9 | −15.08 | 2.15 | 1.76 | 23.38 | Lens 724 |
| S10 | 16.53 | 6.97 | 1.62 | 58.17 | Lens 726 |
| S11 | −21.34 | 0.12 | | | |
| S12 | 28.35 | 6.44 | 1.7 | 55.53 | Lens 728 |
| S13 | −32.78 | 1.58 | | | |
| S14 | 30.52 | 2.71 | 1.53 | 56.04 | Lens 722 |
| S15 | 44.51 | 2.5 | | | |
| S16 | Infinite | 14 | 1.61 | 58.63 | Optical Element |
| S17 | Infinite | 2 | | | |

In foregoing table 13, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 13, the surface S1 is the surface of the lens 712 facing the enlarged side, and the surface S2 is the surface of the lens 712 facing the reduced side. The surfaces S3 and S4 are two surfaces of the lens 714, the surfaces S5 and S6 are two surfaces of the lens 716, and the surfaces S7 and S8 are two surfaces of the lens 718. The surface S9 is the surface of the lens 724 facing the enlarged side, the surface S10 is the surface connecting the lens 724 and the lens 726, and the surface S11 is the surface of the lens 726 facing the reduced side. The surfaces S12 and S13 are two surfaces of the lens 728, and the surfaces S14 and S15 are two surfaces of the lens 722. The surfaces S16 and S17 are two surfaces of the optical element 160.

Moreover, the surfaces S1, S2, S14, and S15 are aspheric surfaces, and which can be expressed as:

$$Z(h) = \frac{cy^2}{1 + \sqrt{1 - (1+K)c^2 y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 13), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S14, and S15 are listed in following table 14.

TABLE 14

| Aspheric Parameter | Conic Constant K | Coefficient $A_2$ | Coefficient $A_3$ | Coefficient $A_4$ |
|---|---|---|---|---|
| S1 | 0 | 3.51E−05 | −2.51E−07 | 1.5E−09 |
| S2 | 0 | 7.72E−06 | −3.17E−07 | −3.83E−10 |
| S14 | 0 | −2.91E−05 | −4.9E−07 | −1.22E−09 |
| S15 | 0 | 1.65E−05 | −6.72E−07 | 2E−10 |

| Aspheric Parameter | Conic Constant K | Coefficient A5 | Coefficient A6 |
|---|---|---|---|
| S1 | 0 | −4.58E−12 | 9.08E−15 |
| S2 | 0 | 5.1E−12 | −3.03E−14 |
| S14 | 0 | 1.17E−11 | 0 |
| S15 | 0 | 1.04E−11 | 0 |

In the present embodiment, the EFL of the fixed-focus lens 700 may be 14.02 mm, the f-number thereof may be 1.5, and the FOV (2ω) thereof may be 60°.

Figure 14A:
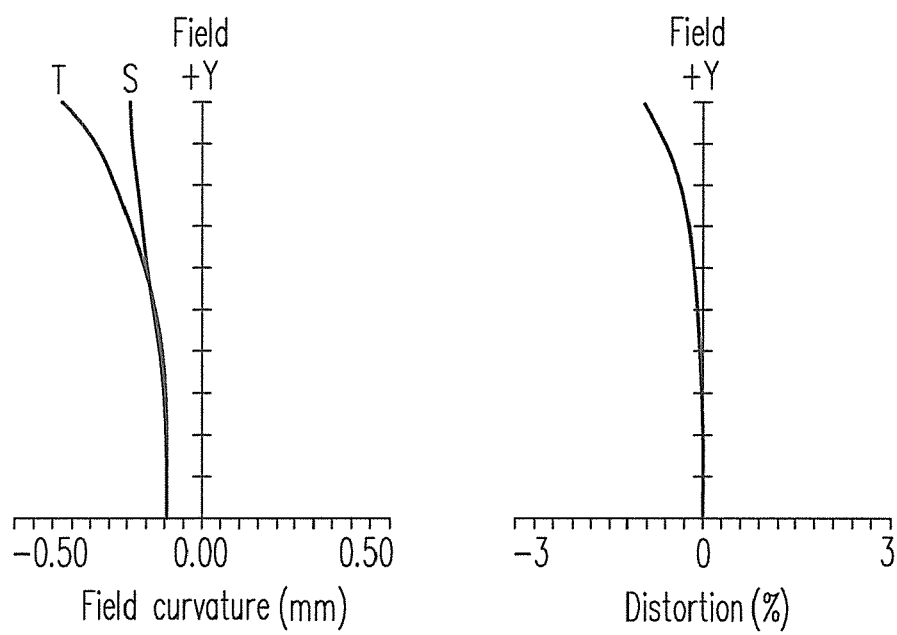
FIGS. 14A-14C are optical imaging simulation data plots of the fixed-focus lens in FIG. 13.
Figure 14B:
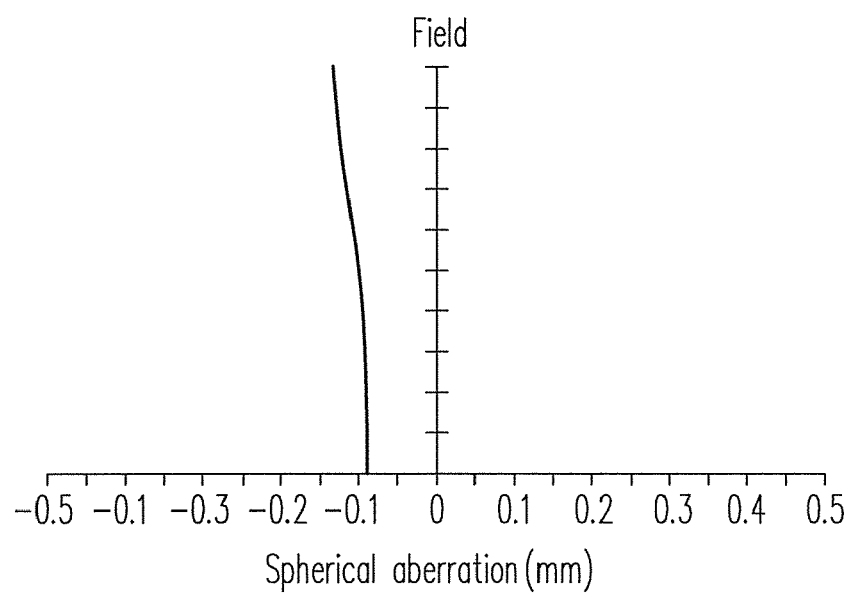
Figure 14C:
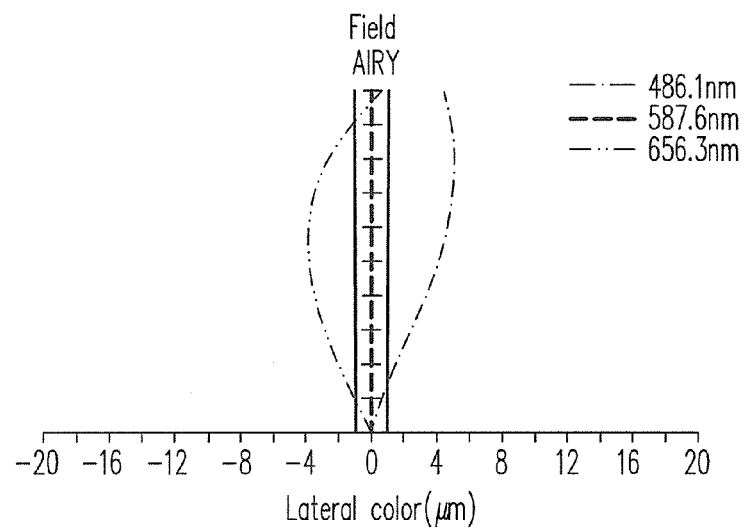

FIGS. 14A-14C are optical imaging simulation data plots of the fixed-focus lens 700 in FIG. 13. Referring to FIGS. 14A-14C, the graphs of field curvature and distortion are sequentially illustrated from left to right in FIG. 14A, the graph of spherical aberration is illustrated in FIG. 14B, and the graph of lateral color aberration is illustrated in FIG. 14C. The graphs illustrated in FIGS. 14A-14C indicate that the fixed-focus lens 700 in the present embodiment has very good imaging quality.

Eighth Embodiment

Figure 15:
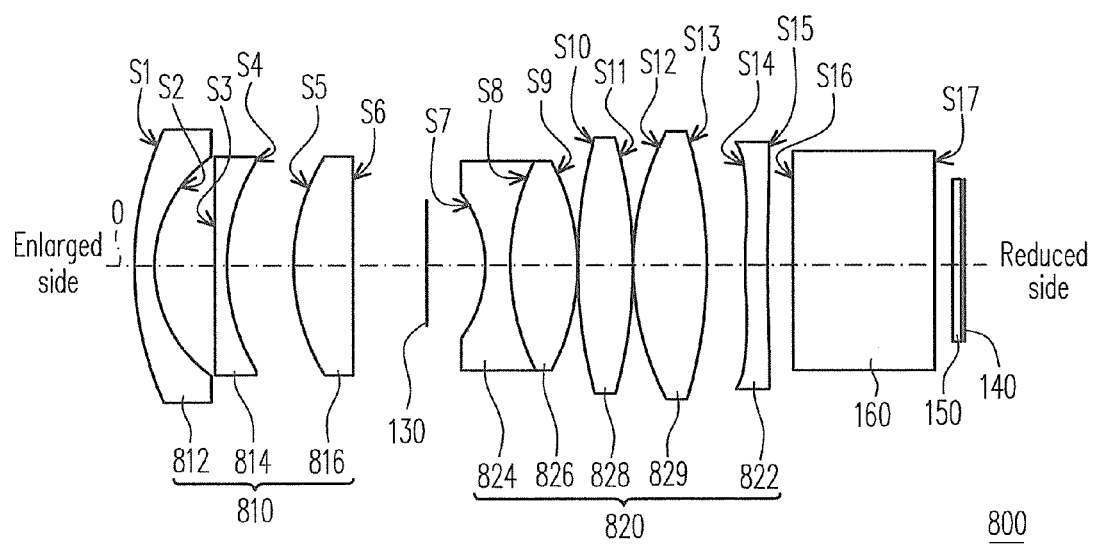
FIG. 15 is a structure diagram of a fixed-focus lens according to an eighth embodiment of the invention.

FIG. 15 is a structure diagram of a fixed-focus lens according to the eighth embodiment of the invention. Referring to FIG. 15, in the present embodiment, the fixed-focus lens 800 is disposed between an enlarged side and a reduced side and includes a first lens group 810 and a second lens group 820 sequentially arranged from the enlarged side to the reduced side. The first lens group 810 includes a lens 812, wherein the lens 812 is an aspheric lens. The second lens group 820 has a positive dioptre and is disposed between the first lens group 810 and the reduced side. The second lens group 820 includes a lens 822, wherein the lens 822 is an aspheric lens. The fixed-focus lens 800 focuses by moving the first lens group 810 and the second lens group 820.

In the present embodiment, the lens 822 has a positive dioptre, and the lens 822 is a lens in the second lens group 820 that is farthest from the aperture diaphragm 130. Besides, the fixed-focus lens 800 satisfies $0.1<|f/f1|<1$, $0.2<|f/f2|<1.5$, and $1.8<L/BFL<3.5$, wherein f is the focal length of the fixed-focus lens 800, f1 is the EFL of the first lens group 810, f2 is the EFL of the second lens group 820, L is the total length of the fixed-focus lens 800, and BFL is the back focal length of the fixed-focus lens 800. In addition, the lens 812 in the first lens group 810 is a meniscus lens having a convex surface facing the enlarged side, and the dioptre of the lens 812 is negative. To be specific, the EFL of the lens 812 is fasp1, and the fixed-focus lens 800 satisfies $0.1<|fasp1/f1|<11$.

As shown in FIG. 15, in the present embodiment, the first lens group 810 has a positive dioptre and includes three lenses. To be specific, the first lens group 810 further includes a lens 814 and a lens 816 sequentially arranged from the enlarged side to the reduced side, wherein the lens 814 and the lens 816 are disposed between the lens 812 and the second lens group 820.

On the other hand, the second lens group 820 further includes a lens 824 and a lens 826 sequentially arranged from the enlarged side to the reduced side. The lens 824 and the lens 826 are disposed between the aperture diaphragm 130 and the lens 822. In addition, the dioptre of the lens 824 is negative and the dioptre of the lens 826 is positive, and the lens 824 and the lens 826 constitute a cemented doublet lens. Moreover, the second lens group 820 further includes a lens 828 and a lens 829. The lens 828 and the lens 829 are disposed between the lens 826 and the lens 822, and the dioptres of the lens 828 and the lens 829 are both positive. Accordingly, the dioptres of the lens 824, the lens 826, the lens 828, the lens 829, and the lens 822 are respectively negative, positive, positive, positive, and positive.

To be specific, in the present embodiment, the lens 814 is a meniscus lens having a convex surface facing the enlarged side, and the lens 816 is a biconvex lens. The lens 824 is a biconcave lens, and the lens 826, the lens 828, and the lens 829 are all biconvex lenses. Besides, in the present embodiment, the lens 812 and the lens 822 of the fixed-focus lens 800 are both aspheric lenses, and the other six lenses are all spherical lenses. The lens 812 and the lens 822 can effectively reduce the spherical aberration, coma, distortion, and astigmatism of the fixed-focus lens 800, and different dioptres combination of the lenses in the second lens group 820 can reduce the coma and distortion of the fixed-focus lens 800. On the other hand, by fabricating the lens 814, 826, or 829 with a low-dispersion material, color aberration of the large-aperture lens can be reduced. The cemented doublet composed of the lens 824 and the lens 826 can reduce the spherical aberration and the color aberration. Color aberration can be effectively reduced by fabricating one of the lens 824 and the lens 826 (for example, the lens 826) with a low-dispersion material.

An example of the fixed-focus lens 800 will be described below. It should be noted that the data in following table 15 is not intended to limit the scope of the invention, and those having ordinary knowledge in the art can appropriately change these parameters and settings according to the present disclosure without departing the scope and spirit of the invention.

TABLE 15

| Surface | Curvature Radius (mm) | Space (mm) | Refractive Index | Abbe Number | Note |
|---|---|---|---|---|---|
| S1 | 39.4 | 2 | 1.49 | 57.44 | Lens 812 |
| S2 | 12.9 | 6.1 | | | |
| S3 | 515 | 1.23 | 1.49 | 70.24 | Lens 814 |
| S4 | 20 | 6.65 | | | |
| S5 | 20.09 | 6.25 | 1.83 | 37.16 | Lens 816 |
| S6 | −401.25 | 13.05 | | | |
| S7 | −12 | 2.28 | 1.73 | 28.46 | Lens 824 |
| S8 | 21.63 | 6.82 | 1.62 | 63.33 | Lens 826 |
| S9 | −22.2 | 0.1 | | | |
| S10 | 47.24 | 5.33 | 1.74 | 49.34 | Lens 828 |
| S11 | −53.17 | 0.1 | | | |
| S12 | 26.95 | 7.33 | 1.5 | 81.61 | Lens 829 |
| S13 | −50.01 | 3.96 | | | |
| S14 | 150.86 | 2.2 | 1.53 | 56.04 | Lens 822 |
| S15 | 301.8 | 2.5 | | | |
| S16 | Infinite | 14 | 1.52 | 64.17 | Optical Element |
| S17 | Infinite | 2 | | | |

In foregoing table 15, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 15, the surface S1 is the surface of the lens 812 facing the enlarged side, and the surface S2 is the surface of the lens 812 facing the reduced side. The surfaces S3 and S4 are two surfaces of the lens 814, and the surfaces S5 and S6 are two surfaces of the lens 816. The surface S7 is the surface of the lens 824 facing the enlarged side, the surface S8 is the surface connecting the lens 824 and the lens 826, and the surface S9 is the surface of the lens 826 facing the reduced side. The surfaces S10 and S11 are two surfaces of the lens 828, the surfaces S12 and S13 are two surfaces of the lens 829, and the surfaces S14 and S15 are two surfaces of the lens 822. The surfaces S16 and S17 are two surfaces of the optical element 160.

Moreover, the surfaces S1, S2, S14, and S15 are aspheric surfaces, and which can be expressed as:

$$Z(h) = \frac{cy^2}{1+\sqrt{1-(1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 15), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficient $A_1$ is 0. Parameters of the surfaces S1, S2, S14, and S15 are listed in following table 16.

TABLE 16

| Aspheric Parameter | Conic Constant K | Coefficient $A_2$ | Coefficient $A_3$ | Coefficient $A_4$ |
|---|---|---|---|---|
| S1 | 0 | 8.56E−05 | −8.22E−07 | 3.88E−09 |
| S2 | 0 | 7.35E−05 | −7.6E−07 | −3.84E−09 |
| S14 | 0 | −7.27E−06 | −5.9E−07 | 2.02E−09 |
| S15 | 0 | 6.39E−05 | −6.46E−07 | 2.190E−09 |

| Aspheric Parameter | Conic Constant K | Coefficient A5 | Coefficient A6 | Coefficient A7 |
|---|---|---|---|---|
| S1 | 0 | −6.66E−12 | −1.88E−14 | 6.96E−17 |
| S2 | 0 | 7.28E−11 | −4.69E−13 | 6.85E−16 |
| S14 | 0 | −3.1E−12 | 0 | 0 |
| S15 | 0 | −5.32E−12 | 0 | 0 |

In the present embodiment, the EFL of the fixed-focus lens 800 may be 13.76 mm, the f-number thereof may be 1.5, and the FOV (2ω) thereof may be 60°.

Figure 16A:
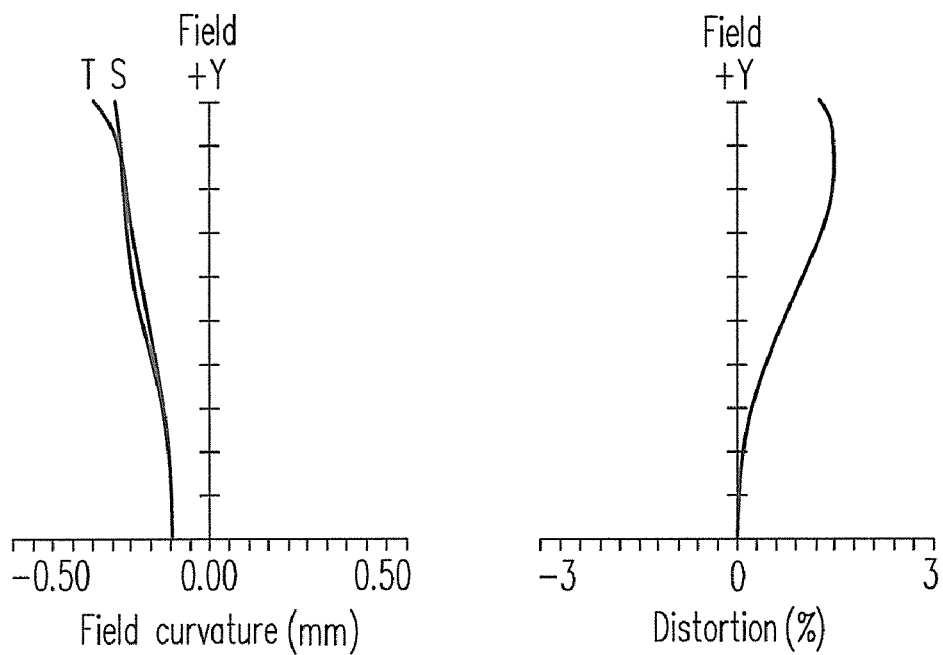
FIGS. 16A-16C are optical imaging simulation data plots of the fixed-focus lens in FIG. 15.
Figure 16B:
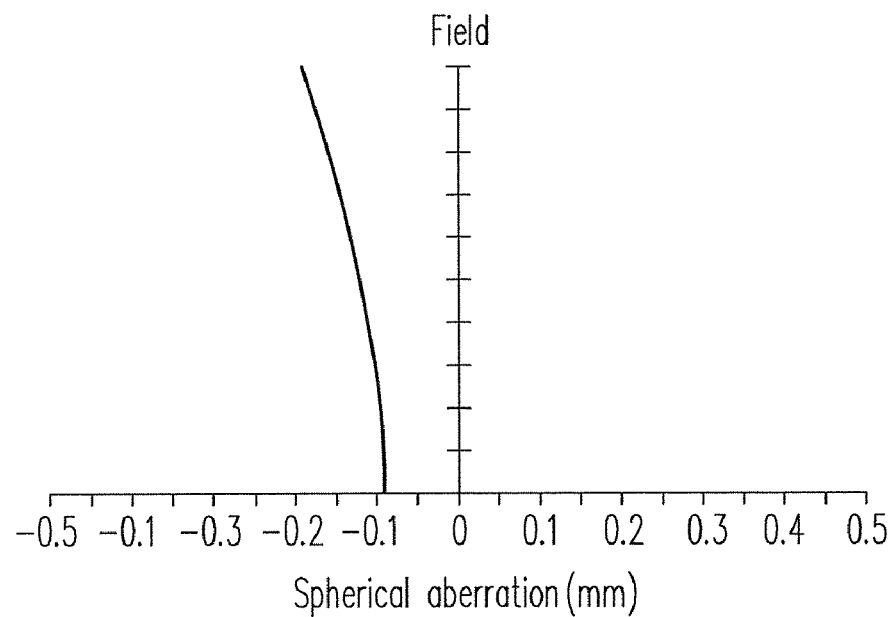
Figure 16C:
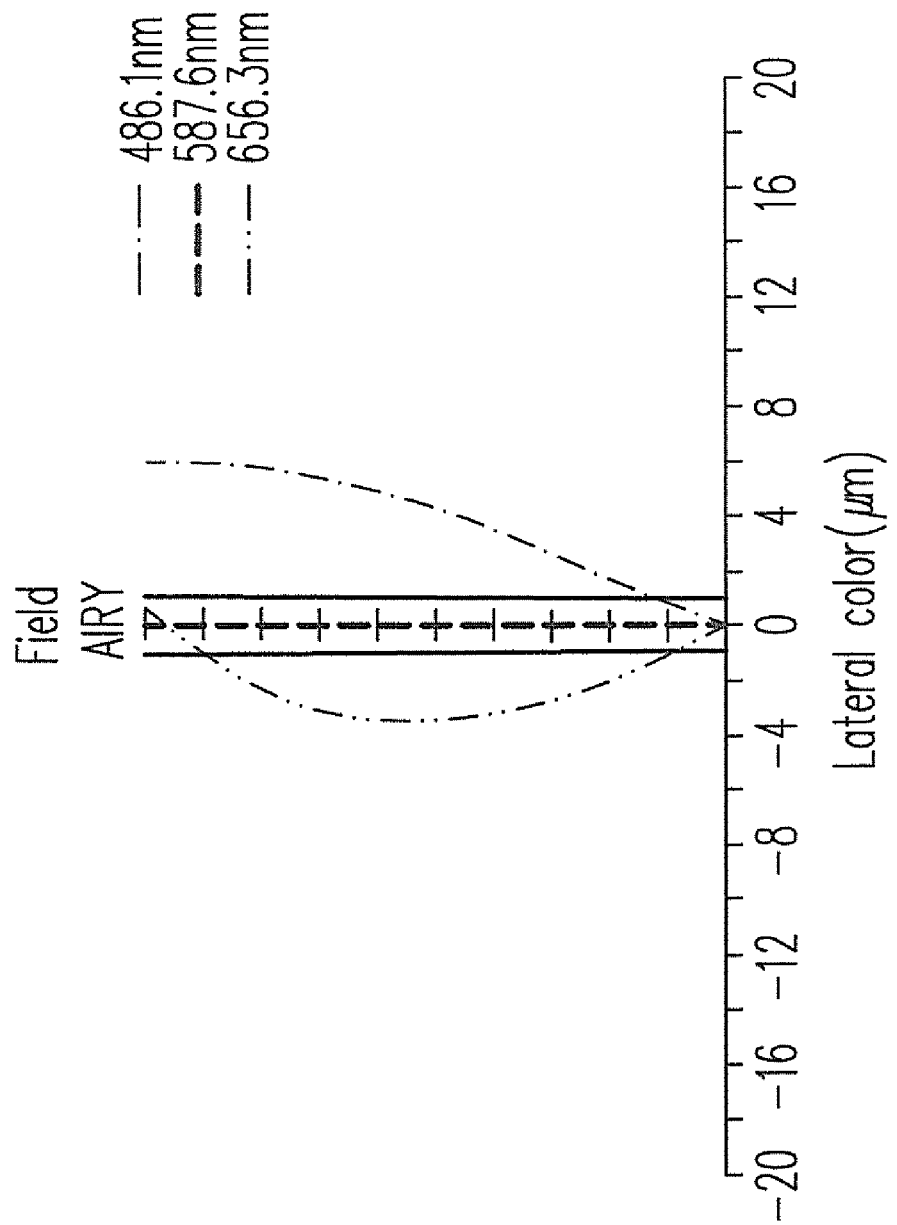

FIGS. 16A-16C are optical imaging simulation data plots of the fixed-focus lens 800 in FIG. 15. Referring to FIGS. 16A-16C, the graphs of field curvature and distortion are sequentially illustrated from left to right in FIG. 16A, the graph of spherical aberration is illustrated in FIG. 16B, and the graph of lateral color aberration is illustrated in FIG. 16C. The graphs illustrated in FIGS. 16A-16C indicate that the fixed-focus lens 800 in the present embodiment has very good imaging quality.

Ninth Embodiment

Figure 17:
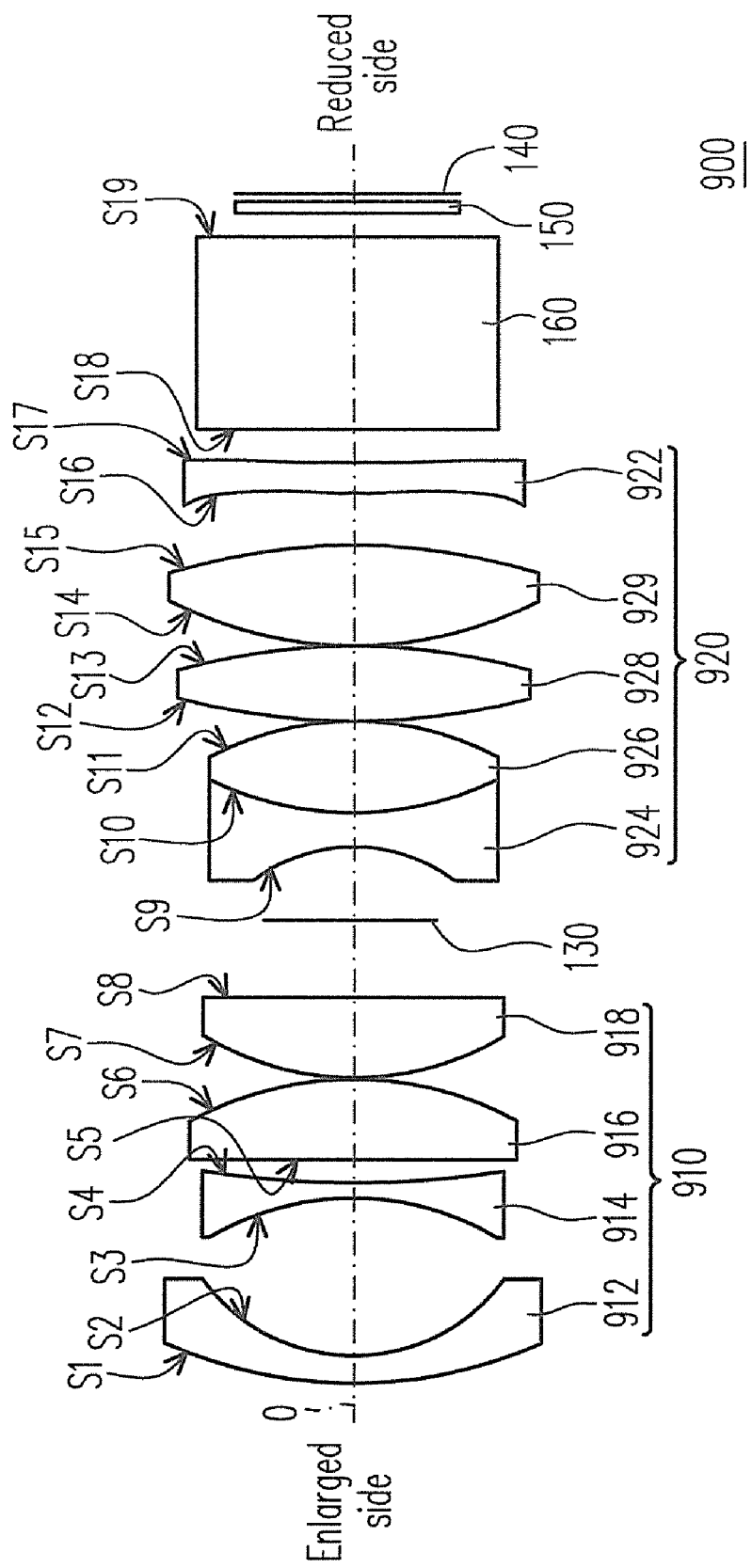
FIG. 17 is a structure diagram of a fixed-focus lens according to a ninth embodiment of the invention.

FIG. 17 is a structure diagram of a fixed-focus lens according to the ninth embodiment of the invention. Referring to FIG. 17, in the present embodiment, the fixed-focus lens 900 is disposed between an enlarged side and a reduced side and includes a first lens group 910 and a second lens group 920 sequentially arranged from the enlarged side to the reduced side. The first lens group 910 includes a lens 912, wherein the lens 912 is an aspheric lens. The second lens group 920 has a positive dioptre and is disposed between the first lens group 910 and the reduced side. The second lens group 920 includes a lens 922, wherein the lens 922 is an aspheric lens. The fixed-focus lens 900 focuses by moving the first lens group 910 and the second lens group 920.

In the present embodiment, the lens 922 has a positive dioptre, and the lens 922 is a lens in the second lens group 920 that is farthest from the aperture diaphragm 130. Besides, the fixed-focus lens 900 satisfies 0.1<|f/f1|<1, 0.2<|f/f2|<1.5, and 1.8<L/BFL<3.5, wherein f is the focal length of the fixed-focus lens 900, f1 is the EFL of the first lens group 910, f2 is the EFL of the second lens group 920, L is the total length of the fixed-focus lens 900, and BFL is the back focal length of the fixed-focus lens 900. In addition, the lens 912 in the first lens group 910 is a meniscus lens having its convex surface facing the enlarged side, and the dioptre of the lens 912 is negative. To be specific, the EFL of the lens 912 is fasp1, and the fixed-focus lens 900 satisfies 0.1<|fasp1/f1|<11.

As shown in FIG. 17, in the present embodiment, the first lens group 910 has a positive dioptre and includes four lenses. To be specific, the first lens group 910 further includes a lens 914, a lens 916, and a lens 918 sequentially arranged from the enlarged side to the reduced side, wherein the lens 914, the lens 916, and the lens 918 are disposed between the lens 912 and the second lens group 920.

On the other hand, the second lens group 920 further includes a lens 924 and a lens 926 sequentially arranged from the enlarged side to the reduced side. The lens 924 and the lens 926 are disposed between the aperture diaphragm 130 and the lens 922. In addition, the dioptre of the lens 924 is negative and the dioptre of the lens 926 is positive, and the lens 924 and the lens 926 constitute a cemented doublet lens. Moreover, the second lens group 920 further includes a lens 928 and a lens 929. The lens 928 and the lens 929 are disposed between the lens 926 and the lens 922, and the dioptres of the lens 928 and the lens 929 are both positive. Accordingly, in the present embodiment, the second lens group 920 includes five lenses, and the dioptres of the lens 924, the lens 926, the lens 928, the lens 929, and the lens 922 are respectively negative, positive, positive, positive, and positive.

To be specific, in the present embodiment, the lens 914 is a biconcave lens, the lens 916 is a biconvex lens, and the lens 918 is a meniscus lens having a convex surface facing the enlarged side. The lens 924 is a biconcave lens, and the lens 926, the lens 928, and the lens 929 are all biconvex lenses. In the present embodiment, the lens 912 and the lens 922 of the fixed-focus lens 900 are both aspheric lenses, and the other seven lenses are all spherical lenses. The lens 912 and the lens 922 can effectively reduce the spherical aberration, coma, distortion, and astigmatism of the fixed-focus lens 900, and different dioptres combination of the lenses in the second lens group 920 can reduce the coma and the distortion of the fixed-focus lens 900. On the other hand, by fabricating the lens 926 or 929 with a low-dispersion material, color aberration of the large-aperture lens can be reduced. The cemented doublet lens composed of the lens 924 and the lens 926 can reduce the spherical aberration and the color aberration. Color aberration can be effectively reduced by fabricating one of the lens 924 and the lens 926 (for example, the lens 926) with a low-dispersion material.

An example of the fixed-focus lens 900 will be described below. It should be noted that the data in following table 17 is not intended to limit the scope of the invention, and those having ordinary knowledge in the art can appropriately change these parameters and settings according to the present disclosure without departing the scope and spirit of the invention.

TABLE 17

| Surface | Curvature Radius (mm) | Space (mm) | Refractive Index | Abbe Number | Note |
|---------|----------------------|------------|------------------|-------------|------|
| S1  | 47        | 2.5    | 1.49 | 57.44 | Lens 912 |
| S2  | 12.65     | 10.507 |      |       |          |
| S3  | −17.621   | 1.752  | 1.73 | 28.53 | Lens 914 |
| S4  | 62.17     | 1.595  |      |       |          |
| S5  | 565.413   | 6.463  | 1.83 | 37.3  | Lens 916 |
| S6  | −24.2     | 0.101  |      |       |          |
| S7  | 22.308    | 5.578  | 1.83 | 37.3  | Lens 918 |
| S8  | 286.069   | 15.833 |      |       |          |
| S9  | −14.826   | 1.106  | 1.76 | 26.52 | Lens 924 |
| S10 | 19.452    | 4.094  | 1.49 | 70.41 | Lens 926 |
| S11 | −305.582  | 0.1    |      |       |          |
| S12 | 76.039    | 5.301  | 1.77 | 49.62 | Lens 928 |
| S13 | −25.066   | 0.1    |      |       |          |
| S14 | 27.377    | 7.458  | 1.5  | 81.61 | Lens 929 |
| S15 | −33.686   | 0.943  |      |       |          |
| S16 | 48.611    | 3.209  | 1.53 | 56.04 | Lens 922 |
| S17 | 3223.278  | 2.482  |      |       |          |
| S18 | Infinite  | 14     | 1.52 | 64.17 | Optical Element |
| S19 | Infinite  | 2      |      |       |          |

In foregoing table 17, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 17, the surface S1 is the surface of the lens 912 facing the enlarged side, and the surface S2 is the surface of the lens 912 facing the reduced side. The surfaces S3 and S4 are two surfaces of the lens 914, the surfaces S5 and S6 are two surfaces of the lens 916, and the surfaces S7 and S8 are two surfaces of the lens 918. The surface S9 is the surface of the lens 924 facing the enlarged side, the surface S10 is the surface connecting the lens 924 and the lens 926, and the surface S11 is the surface of the lens 926 facing the reduced side. The surfaces S12 and S13 are two surfaces of the lens 928, the surfaces S14 and S15 are two surfaces of the lens 929, and the surfaces S16 and S17 are two surfaces of the lens 922. The surfaces S18 and S19 are two surfaces of the optical element 160.

Moreover, the surfaces S1, S2, S16, and S17 are aspheric surfaces, and which can be expressed as:

$$Z(h) = \frac{cy^2}{1 + \sqrt{1 - (1+K)c^2 y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 17), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficient $A_1$ is 0. Parameters of the surfaces S1, S2, S16, and S17 are listed in following table 18.

TABLE 18

| Aspheric Parameter | Conic Constant K | Coefficient $A_2$ | Coefficient $A_3$ | Coefficient $A_4$ |
|---|---|---|---|---|
| S1  | 0 | 2.723E−05  | −1.602E−07 | 5.722E−10  |
| S2  | 0 | −1.039E−05 | −2.77E−07  | −1.032E−09 |
| S16 | 0 | −3.821E−05 | −2.448E−07 | −1.757E−09 |
| S17 | 0 | 1.306E−06  | −3.618E−07 | −5.955E−10 |

| Aspheric Parameter | Conic Constant K | Coefficient A5 | Coefficient A6 | Coefficient A7 |
|---|---|---|---|---|
| S1  | 0 | 1.425E−12 | −1.652E−14 | 4.283E−17  |
| S2  | 0 | 3.848E−12 | −2.588E−14 | −2.657E−16 |
| S16 | 0 | 1.079E−11 | 0 | 0 |
| S17 | 0 | 8.187E−12 | 0 | 0 |

In the present embodiment, the EFL of the fixed-focus lens 900 may be 13.94 mm, the f-number thereof may be 1.5, and the FOV (2ω)) thereof may be 60°.

Figure 18A:
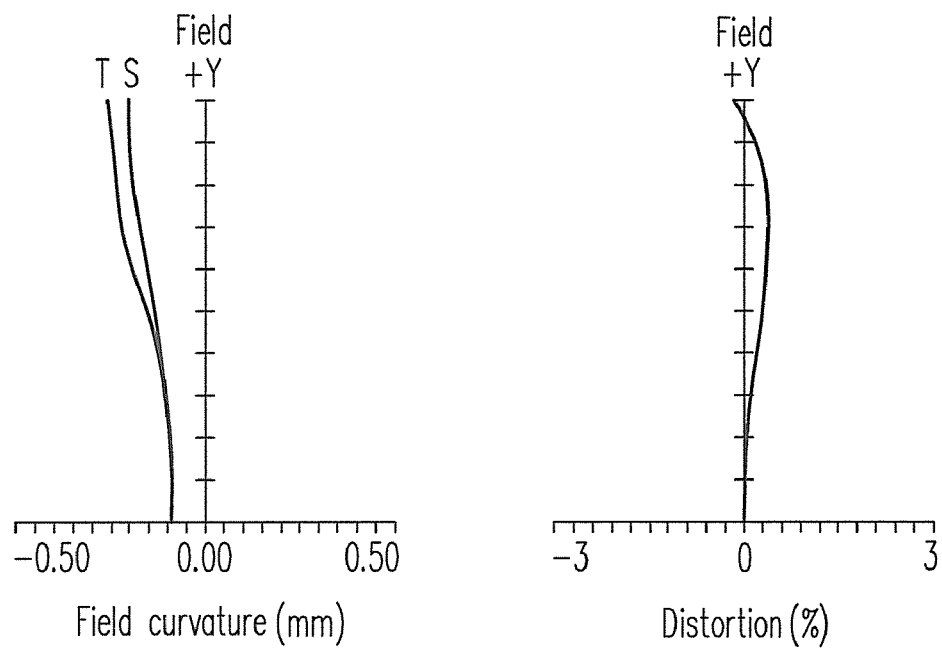
FIGS. 18A-18C are optical imaging simulation data plots of the fixed-focus lens in FIG. 17.
Figure 18B:
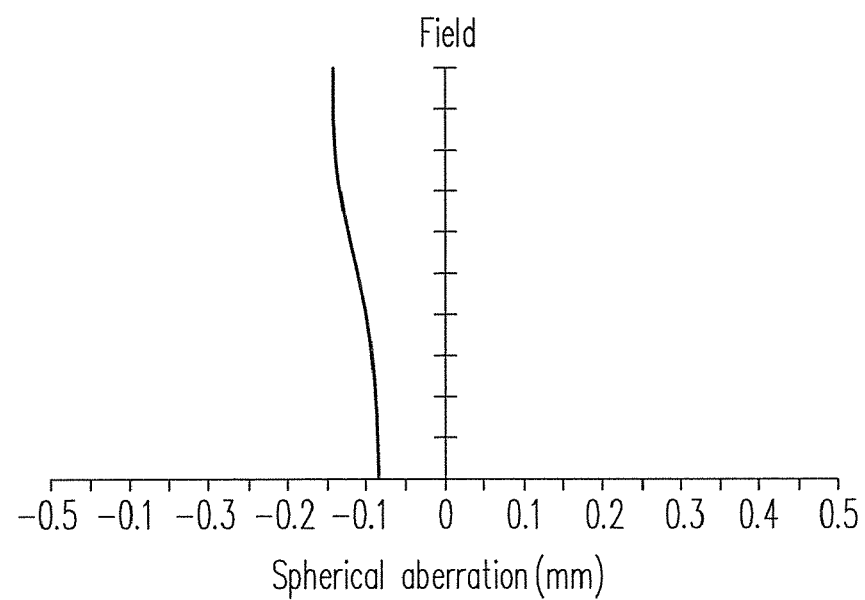
Figure 18C:
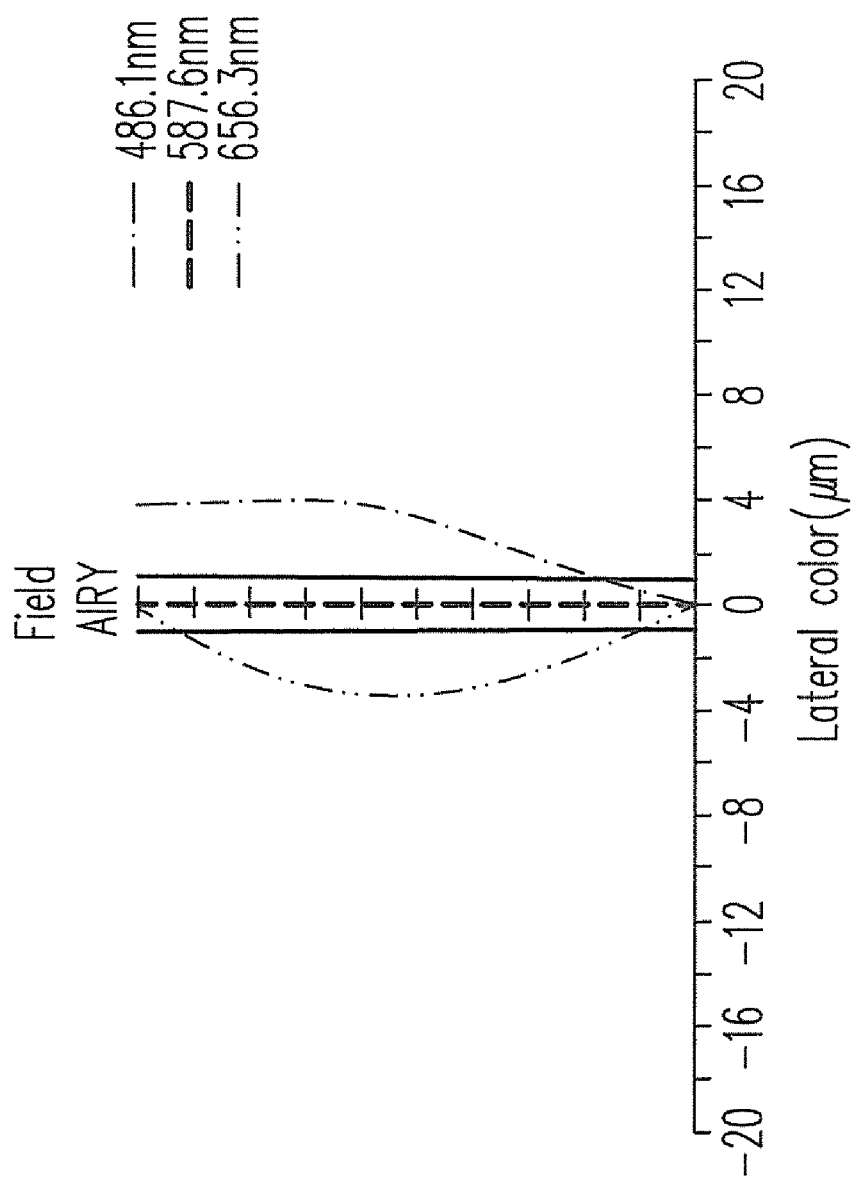

FIGS. 18A-18C are optical imaging simulation data plots of the fixed-focus lens 900 in FIG. 17. Referring to FIGS. 18A-18C, the graphs of field curvature and distortion are sequentially illustrated from left to right in FIG. 18A, the graph of spherical aberration is illustrated in FIG. 18B, and the graph of lateral color aberration is illustrated in FIG. 18C. The graphs illustrated in FIGS. 18A-18C indicate that the fixed-focus lens 900 in the present embodiment has very good imaging quality.

Tenth Embodiment

Figure 19:
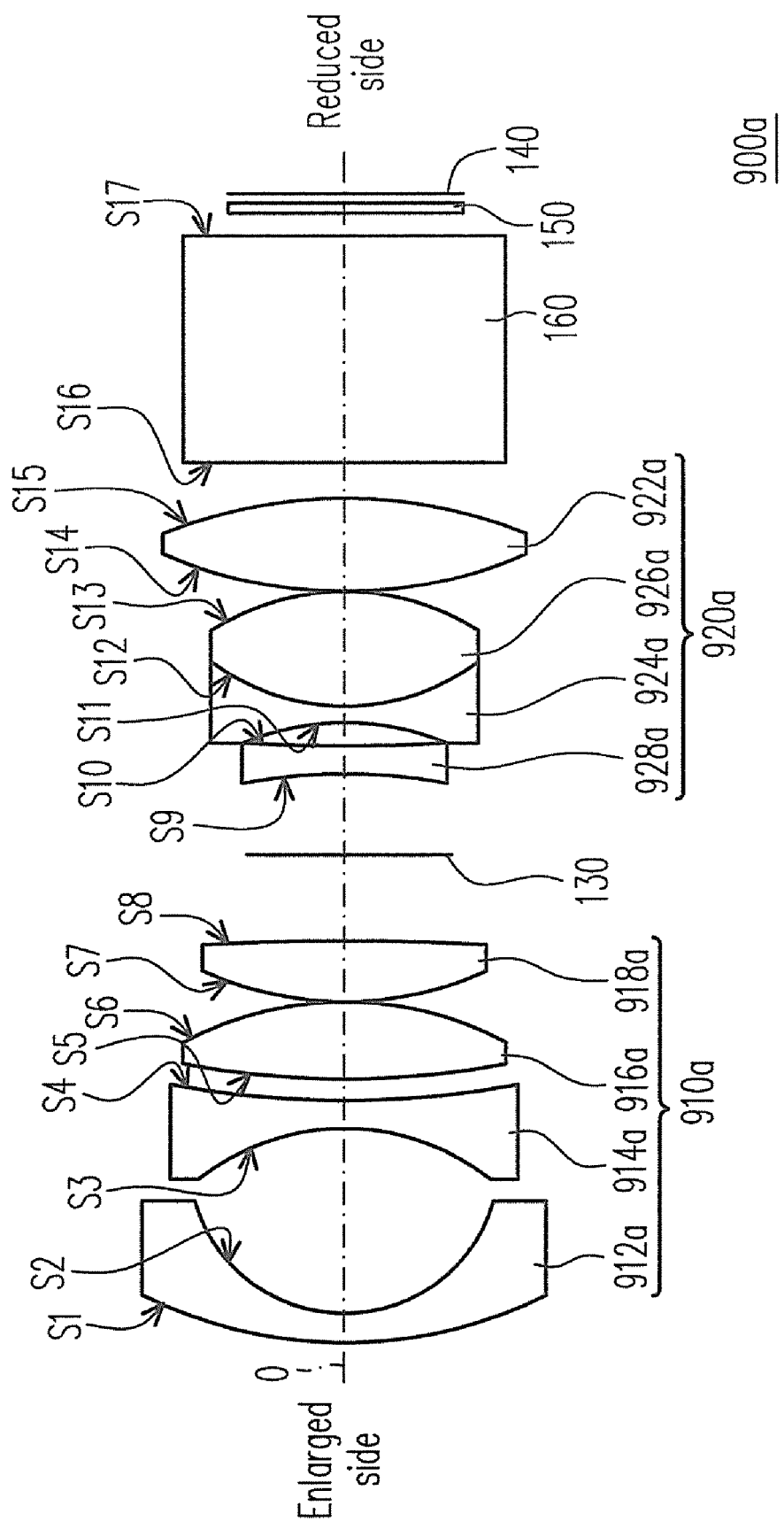
FIG. 19 is a structure diagram of a fixed-focus lens according to a tenth embodiment of the invention.

FIG. 19 is a structure diagram of a fixed-focus lens according to the tenth embodiment of the invention. Referring to FIG. 19, in the present embodiment, the fixed-focus lens 900a is disposed between an enlarged side and a reduced side and includes a first lens group 910a and a second lens group 920a sequentially arranged from the enlarged side to the reduced side. The first lens group 910a includes a lens 912a, wherein the lens 912a is an aspheric lens. The second lens group 920a has a positive dioptre and is disposed between the first lens group 910a and the reduced side. The second lens group 920a includes a lens 928a, wherein the lens 928a is an aspheric lens. The fixed-focus lens 900a focuses by moving the first lens group 910a and the second lens group 920a.

In the present embodiment, the lens 928a has a negative dioptre and is a lens in the second lens group 920a that is closest to the aperture diaphragm 130. Besides, the fixed-focus lens 900a satisfies 0.2<|f/f1|<1, 0.3<|f/f2|<1, and 1.5<L/BEL<3.5, wherein f is the focal length of the fixed-focus lens 900a, f1 is the EFL of the first lens group 910a, f2 is the EFL of the second lens group 920a, L is the total length of the fixed-focus lens 900a, and BFL is the back focal length of the fixed-focus lens 900a.

In addition, the lens 912a in the first lens group 910a is a meniscus lens having a convex surface facing the enlarged side, and the dioptre of the lens 912a is negative. To be specific, the EFL of the lens 912a is fasp1, and the fixed-focus lens 900a satisfies 0.5<|fasp1/f1|<3.

As shown in FIG. 19, in the present embodiment, the first lens group 910a has a positive dioptre and includes four lenses. To be specific, the first lens group 910a further includes a lens 914a, a lens 916a, and a lens 918a, wherein the lens 914a, the lens 916a, and the lens 918a are disposed between the lens 912a and the second lens group 920a.

On the other hand, the second lens group 920a further includes a lens 924a, a lens 926a, and a lens 922a sequentially arranged from the enlarged side to the reduced side. The lens 924a, the lens 926a, and the lens 922a are disposed between the lens 928a and the reduced side, and the dioptre of the lens 922a is positive. In addition, the dioptre of the lens 924a is negative and the dioptre of the lens 926a is positive, and the lens 924a and the lens 926a constitute a cemented doublet lens, wherein the cemented doublet lens is the second lens after the aperture diaphragm 130. Accordingly, in the present embodiment, the second lens group 920a includes four lenses, and the dioptres of the lens 928a, the lens 924a, the lens 926a, and the lens 922a are respectively negative, negative, positive, and positive.

To be specific, in the present embodiment, the lens 914a is a biconcave lens, the lens 916a is a biconvex lens, and the lens 918a is a biconvex lens. The lens 924a is a biconcave lens, the lens 926a is a biconvex lens, and the lens 922a is a biconvex lens. Besides, in the present embodiment, the lens 912a and the lens 928a of the fixed-focus lens 900a are both aspheric lenses, and the other six lenses are all spherical lenses. The lens 912a and the lens 928a can effectively reduce the distortion and astigmatism, different dioptres combination of other spherical lenses can reduce the spherical aberration, coma, and field curvature. Different dioptres combination of the lenses in the second lens group 920a can reduce the coma and distortion of the fixed-focus lens 900a. On the other hand, by fabricating the lens 926a with a low-dispersion material, color aberration of the large-aperture lens can be reduced. The cemented doublet lens composed of the lens 924a and the lens 926a can reduce the spherical aberration and the color aberration. Color aberration can be effectively reduced by fabricating one of the lens 924a and the lens 926a (for example, the lens 926a) with a low-dispersion material.

An example of the fixed-focus lens 900a will be described below. It should be noted that the data in following table 19 is not intended to limit the scope of the invention, and those having ordinary knowledge in the art can appropriately change these parameters and settings according to the present disclosure without departing the scope and spirit of the invention.

TABLE 19

| Surface | Curvature Radius (mm) | Space (mm) | Refractive Index | Abbe Number | Note |
|---|---|---|---|---|---|
| S1 | 55.21 | 2 | 1.49 | 57.44 | Lens 912a |
| S2 | 11.6 | 13.36 | | | |
| S3 | −18.67 | 2 | 1.58 | 40.25 | Lens 914a |
| S4 | 61.73 | 1.52 | | | |
| S5 | 60.4 | 5.55 | 1.77 | 49.6 | Lens 916a |
| S6 | −26.29 | 0.1 | | | |
| S7 | 26.69 | 4.24 | 1.77 | 49.6 | Lens 918a |
| S8 | −196.54 | 11.86 | | | |
| S9 | −23.14 | 2 | 1.53 | 55.95 | Lens 928a |
| S10 | −35.62 | 1.67 | | | |
| S11 | −19.93 | 1.2 | 1.80 | 25.43 | Lens 924a |
| S12 | 15.68 | 8.39 | 1.63 | 59.14 | Lens 926a |
| S13 | −18.61 | 0.1 | | | |
| S14 | 34.57 | 6.56 | 1.77 | 49.6 | Lens 922a |
| S15 | −35.27 | 2.5 | | | |
| S16 | Infinite | 16 | 1.61 | 58.63 | Optical Element |
| S17 | Infinite | 2 | | | |

In foregoing table 19, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 19, the surface S1 is the surface of the lens 912a facing the enlarged side, and the surface S2 is the surface of the lens 912a facing the reduced side. The surfaces S3 and S4 are two surfaces of the lens 914a, the surfaces S5 and S6 are two surfaces of the lens 916a, and the surfaces S7 and S8 are two surfaces of the lens 918a. The surfaces S9 and S10 are two surfaces of the lens 928a. The surface S11 is the surface of the lens 924a facing the enlarged side, the surface S12 is the surface connecting the lens 924a and the lens 926a, and the surface S13 is the surface of the lens 926a facing the reduced side. The surfaces S14 and S15 are two surfaces of the lens 922a. The surfaces S16 and S17 are two surfaces of the optical element 160.

Moreover, the surfaces S1, S2, S9, and S10 are aspheric surfaces, and which can be expressed as:

$$Z(h) = \frac{cy^2}{1 + \sqrt{1 - (1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 19), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S1, S2, S9, and S10 are listed in following table 20.

TABLE 20

| Aspheric Parameter | Conic Constant K | Coefficient $A_2$ | Coefficient $A_3$ | Coefficient $A_4$ |
|---|---|---|---|---|
| S1 | 0 | 1.47E−04 | −1.57E−06 | 1.04E−08 |
| S2 | 0 | 1.53E−04 | −9.85E−07 | −9.54E−09 |
| S9 | 0 | 3.41E−04 | −2.09E−06 | −1.34E−08 |
| S10 | 0 | 4.15E−04 | −1.2E−06 | −2.31E−08 |

| Aspheric Parameter | Conic Constant K | Coefficient A5 | Coefficient A6 |
|---|---|---|---|
| S1 | 0 | −3.89E−11 | 6.012E−14 |
| S2 | 0 | 1.95E−10 | −1.08E−12 |
| S9 | 0 | 1.22E−10 | 0 |
| S10 | 0 | 1.2E−10 | 0 |

In the present embodiment, the EFL of the fixed-focus lens 900a may be 13.69 mm, the f-number thereof may be 1.5, and the FOV (2ω) thereof may be 60°.

Figure 20A:
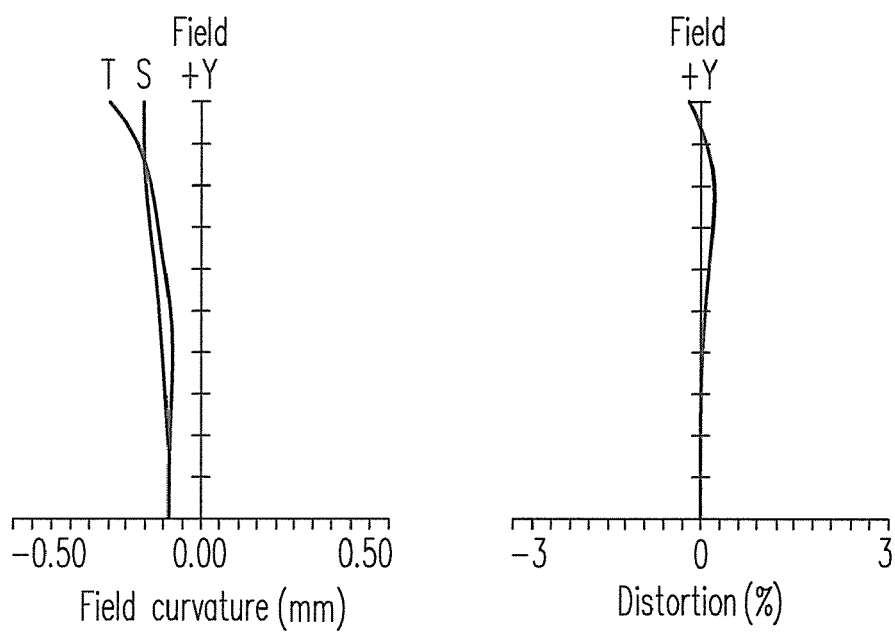
FIGS. 20A-20C are optical imaging simulation data plots of the fixed-focus lens in FIG. 19.
Figure 20B:
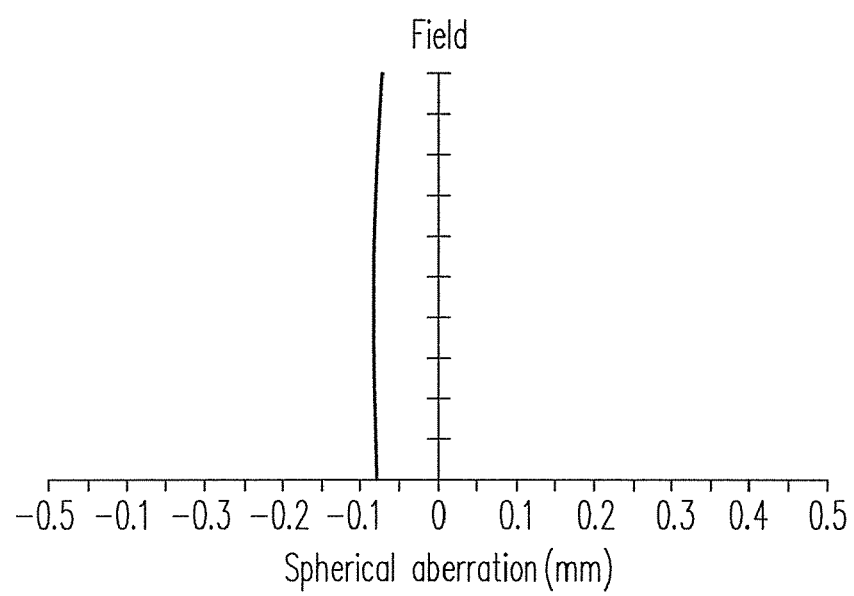
Figure 20C:
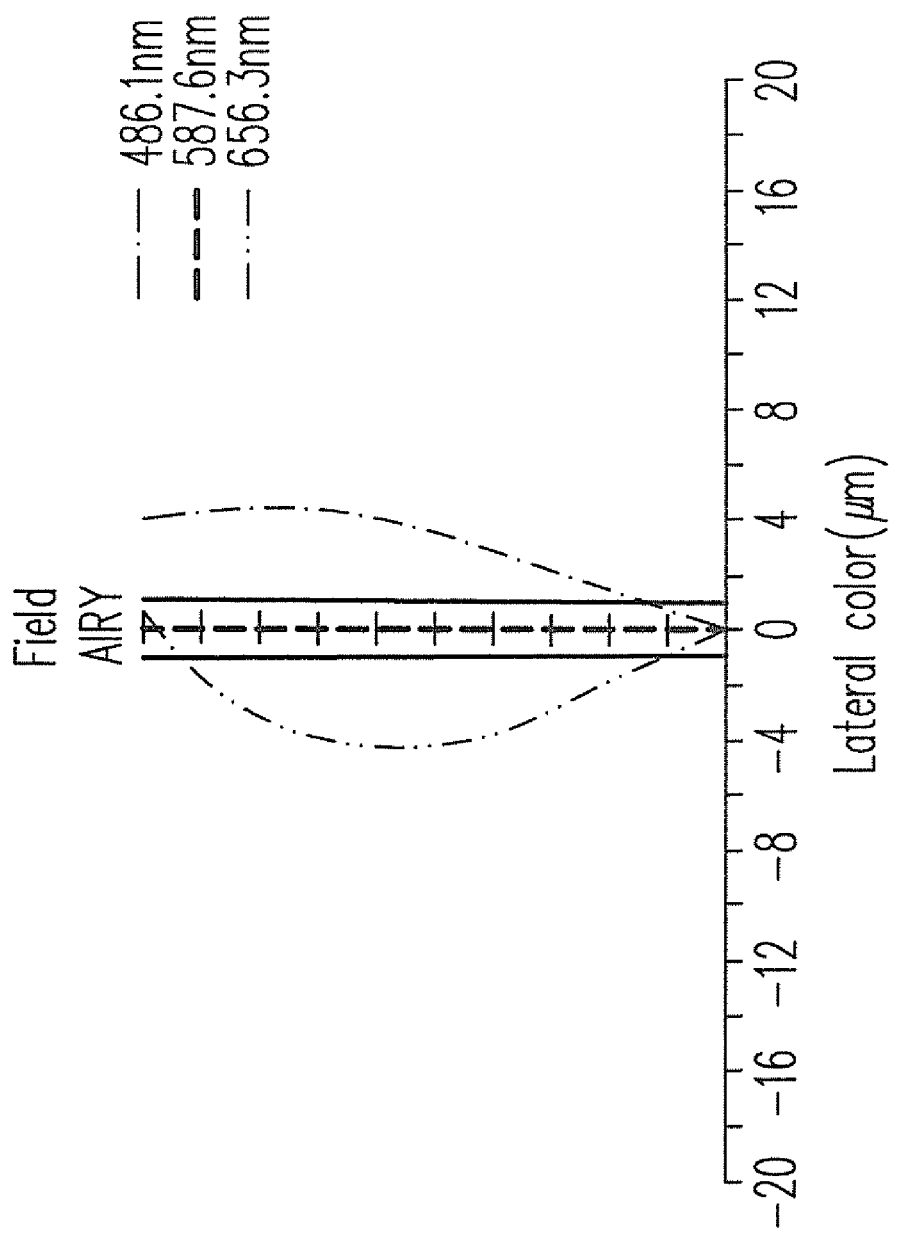

FIGS. 20A-20C are optical imaging simulation data plots of the fixed-focus lens 900a in FIG. 19. Referring to FIGS. 20A-20C, the graphs of field curvature and distortion are sequentially illustrated from left to right in FIG. 20A, the graph of spherical aberration is illustrated in FIG. 20B, and the graph of lateral color aberration is illustrated in FIG. 20C. The graphs illustrated in FIGS. 20A-20C indicate that the fixed-focus lens 900a in the present embodiment has very good imaging quality.

Eleventh Embodiment

Figure 21:
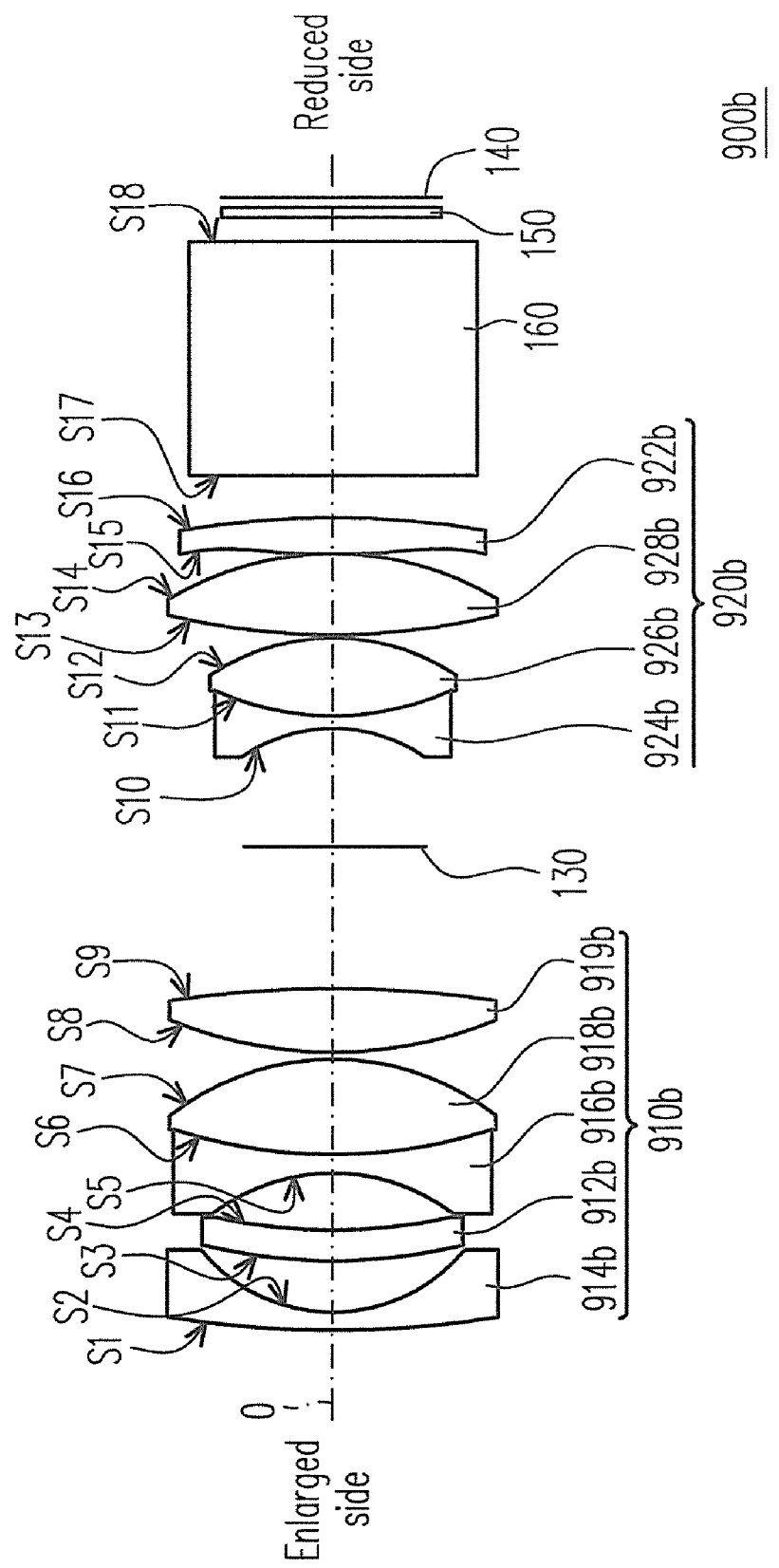
FIG. 21 is a structure diagram of a fixed-focus lens according to an eleventh embodiment of the invention.

FIG. 21 is a structure diagram of a fixed-focus lens according to the eleventh embodiment of the invention. Referring to FIG. 21, in the present embodiment, the fixed-focus lens 900b is disposed between an enlarged side and a reduced side and includes a first lens group 910b and a second lens group 920b sequentially arranged from the enlarged side to the reduced side. The first lens group 910b includes a lens 912b, wherein the lens 912b is an aspheric lens. The second lens group 920b has a positive dioptre and is disposed between the first lens group 910b and the reduced side. The second lens group 920b includes a lens 922b, wherein the lens 922b is an aspheric lens. The fixed-focus lens 900b focuses by moving the first lens group 910b and the second lens group 920b.

In the present embodiment, the lens 922b has a positive dioptre, and the lens 922b is a lens in the second lens group 920b that is farthest from the aperture diaphragm 130. Besides, the fixed-focus lens 900b satisfies $0.1<|f/f1|<1$, $0.2<|f/f2|<1.5$, and $1.8<L/BEL<3.5$, wherein f is the focal length of the fixed-focus lens 900b, f1 is the EFL of the first lens group 910b, f2 is the EFL of the second lens group 920b, L is the total length of the fixed-focus lens 900b, and BFL is the back focal length of the fixed-focus lens 900b. In addition, the lens 912b in the first lens group 910b is a meniscus lens having its convex surface facing the enlarged side, and the dioptre of the lens 912b is negative. To be specific, the EFL of the lens 912b is fasp1, and the fixed-focus lens 900b satisfies $0.1<|fasp1/f1|<11$.

As shown in FIG. 21, in the present embodiment, the first lens group 910b has a positive dioptre and includes five lenses. To be specific, the first lens group 910b further includes a lens 914b disposed between the enlarged side and the lens 912b. Namely, the lens 912b is the second lens from the enlarged side in the first lens group 910b. Additionally, the first lens group 910b further includes a lens 916b, a lens 918b, and a lens 919b, wherein the lens 916b, the lens 918b, and the lens 919b are disposed between the lens 912b and the second lens group 920b. The lens 916b and the lens 918b constitute a cemented doublet lens between the lens 912b and the aperture diaphragm 130. To be specific, in the present embodiment, the cemented doublet lens composed of the lens 916b and the lens 918b is next to the aspheric lens (i.e., the lens 912b).

On the other hand, the second lens group 920b further includes a lens 924b and a lens 926b sequentially arranged from the enlarged side to the reduced side. The lens 924b and the lens 926b are disposed between the first lens group 910b and the lens 922b. Besides, the dioptre of the lens 924b is negative and the dioptre of the lens 926b is positive, and the lens 924b and the lens 926b constitute a cemented doublet. Moreover, the second lens group 920 further includes a lens 928b disposed between the lens 926b and the lens 922b, wherein the dioptre of the lens 928b is positive. Accordingly, the dioptres of the lens 924b, the lens 926b, the lens 928b, and the lens 922b are respectively negative, positive, positive, and positive.

To be specific, in the present embodiment, the lens 914b is a meniscus lens having a convex surface facing the enlarged side. The lens 916b is a biconcave lens, the lens 918b is a biconvex lens, and the lens 919b is a biconvex lens. The lens 924b is a biconcave lens, the lens 926b is a biconvex lens, and the lens 928b is a biconvex lens. Besides, in the present embodiment, the lens 912b and the lens 922b of the fixed-focus lens 900b are both aspheric lenses, and the other seven lenses are all spherical lenses. The lens 912b and the lens 922b can effectively reduce the distortion and astigmatism. Different dioptres combination of the lenses can reduce the coma and distortion. The cemented doublet lens composed of the lens 924b and the lens 926b in the second lens group 920b can reduce the spherical aberration and the color aberration. By fabricating the lens 926b or 924b with a low-dispersion material, color aberration of the large-aperture lens can be reduced. The cemented doublet lens composed of the lens 916b and the lens 918b in the first lens group 910b can effectively reduce the field curvature and color aberration. Color aberration can be effectively reduced by fabricating the lens 914b or 922b with a low-dispersion material. The first lens group 910b and the second lens group 920b respectively include a cemented doublet lens for reducing the spherical aberration, coma, and field curvature therein.

An example of the fixed-focus lens 900b will be described below. It should be noted that the data in following table 21 is not intended to limit the scope of the invention, and those having ordinary knowledge in the art can appropriately change these parameters and settings according to the present disclosure without departing the scope and spirit of the invention.

TABLE 21

| Surface | Curvature Radius (mm) | Space (mm) | Refractive Index | Abbe Number | Note |
|---|---|---|---|---|---|
| S1 | 85.8 | 1.367 | 1.49 | 70.41 | Lens 914b |
| S2 | 13 | 3.89 | | | |
| S3 | 572.276 | 2.398 | 1.53 | 56.04 | Lens 912b |
| S4 | 121.3 | 4.496 | | | |
| S5 | −15.928 | 1.256 | 1.85 | 23.78 | Lens 916b |
| S6 | 38.644 | 7.353 | 1.80 | 42.37 | Lens 918b |
| S7 | −20.083 | 0.417 | | | |
| S8 | 30.553 | 4.703 | 1.85 | 23.78 | Lens 919b |
| S9 | −101.977 | 19.636 | | | |
| S10 | −13.649 | 1 | 1.73 | 28.53 | Lens 924b |
| S11 | 22.208 | 5.965 | 1.50 | 81.61 | Lens 926b |
| S12 | −17.675 | 0.12 | | | |
| S13 | 43.34 | 6.409 | 1.70 | 55.41 | Lens 928b |
| S14 | −23.322 | 0.12 | | | |
| S15 | 79.417 | 2.58 | 1.59 | 61.15 | Lens 922b |
| S16 | −125.385 | 3 | | | |
| S17 | Infinite | 18.55 | 1.65 | 33.85 | Optical Element |
| S18 | Infinite | 1.9 | | | |

In foregoing table 21, "curvature radius" refers to the curvature radius of each surface, and "space" refers to the straight distance between adjacent two surfaces along the optical axis O. For example, the space of the surface S1 is the straight distance between the surface S1 and the surface S2 along the optical axis O. The thickness, refractive index, and Abbe number of each lens in the "Note" field can be referred to the corresponding values of the space, refractive index, and Abbe number in the same row.

Besides, in foregoing table 21, the surface S1 is the surface of the lens 914b facing the enlarged side, and the surface S2 is the surface of the lens 914b facing the reduced side. The surfaces S3 and S4 are two surfaces of the lens 912b. The surface S5 is the surface of the lens 916b facing the enlarged side, the surface S6 is the surface connecting the lens 916b and the lens 918b, and the surface S7 is the surface of the lens 918b facing the reduced side. The surfaces S8 and S9 are two surfaces of the lens 919b. The surface S10 is the surface of the lens 924b facing the enlarged side, the surface S11 is the surface connecting the lens 924b and the lens 926b, and the surface S12 is the surface of the lens 926b facing the reduced side. The surfaces S13 and S14 are two surfaces of the lens 928b, the surfaces S15 and S16 are two surfaces of the lens 922b, and the surfaces S17 and S18 are two surfaces of the optical element 160.

Moreover, the surfaces S3, S4, S15, and S16 are aspheric surfaces, and which can be expressed as:

$$Z(h) = \frac{cy^2}{1+\sqrt{1-(1+K)c^2y^2}} + A_1 y^2 + A_2 y^4 + A_3 y^6 + A_4 y^8 + A_5 y^{10} + A_6 y^{12} + A_7 y^{14}$$

In foregoing expression, Z is the sag along the direction of the optical axis O, c is the reciprocal of the radius of an osculating sphere (i.e., the reciprocal of the curvature radius close to the optical axis O, such as the curvature radii of the surfaces S1 and S2 in foregoing table 21), K is a conic coefficient, y is the vertical height from an aspheric surface to the optical axis O (i.e., the height from the center of the lens to the rim of the lens), and $A_1$-$A_7$ are aspheric coefficients, wherein the aspheric coefficients $A_1$ and $A_7$ are 0. Parameters of the surfaces S3, S4, S15, and S16 are listed in following table 20.

TABLE 22

| Aspheric Parameter | Conic Constant K | Coefficient $A_2$ | Coefficient $A_3$ | Coefficient $A_4$ |
|---|---|---|---|---|
| S3 | 0 | 1.578E−04 | −6.662E−07 | 3.857E−09 |
| S4 | 0 | 1.454E−04 | −7.621E−07 | 5.634E−09 |
| S15 | 0 | −3.324E−05 | −3.115E−08 | −7.503E−10 |
| S16 | 0 | −7.597E−06 | 1.071E−08 | −8.268E−10 |

| Aspheric Parameter | Conic Constant K | Coefficient A5 | Coefficient A6 |
|---|---|---|---|
| S3 | 0 | −1.825E−11 | −2.758E−14 |
| S4 | 0 | −5.493E−11 | 9.224E−14 |
| S15 | 0 | 2.115E−12 | 0 |
| S16 | 0 | 3.083E−12 | 0 |

In the present embodiment, the EFL of the fixed-focus lens 900b may be 14 mm, the f-number thereof may be 1.8, and the FOV (2ω) thereof may be 58.4°.

Figure 22A:
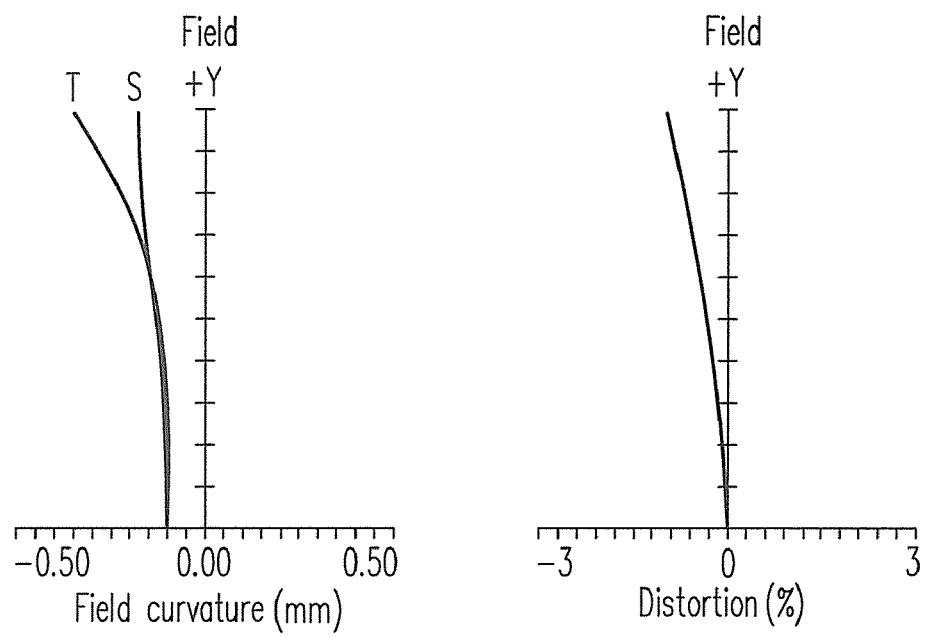
FIGS. 22A-22C are optical imaging simulation data plots of the fixed-focus lens in FIG. 21.
Figure 22B:
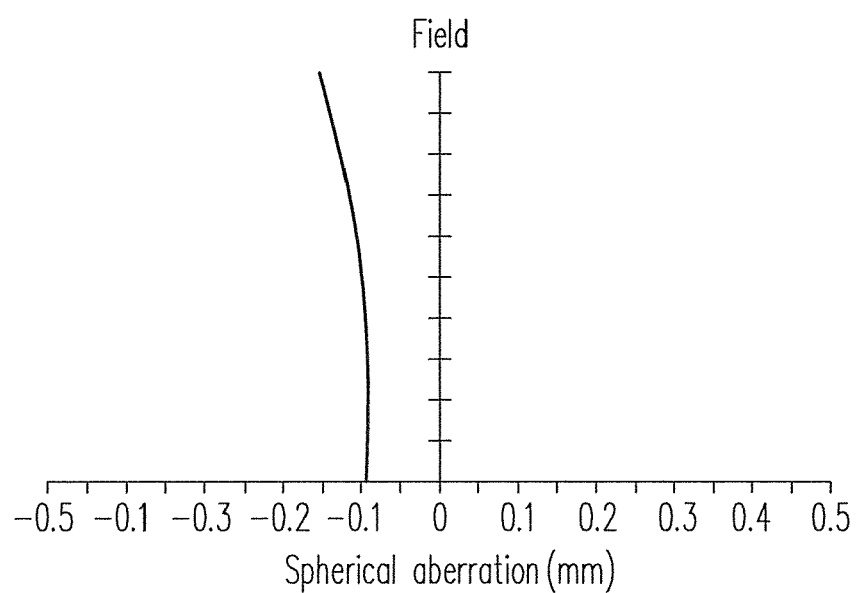
Figure 22C:
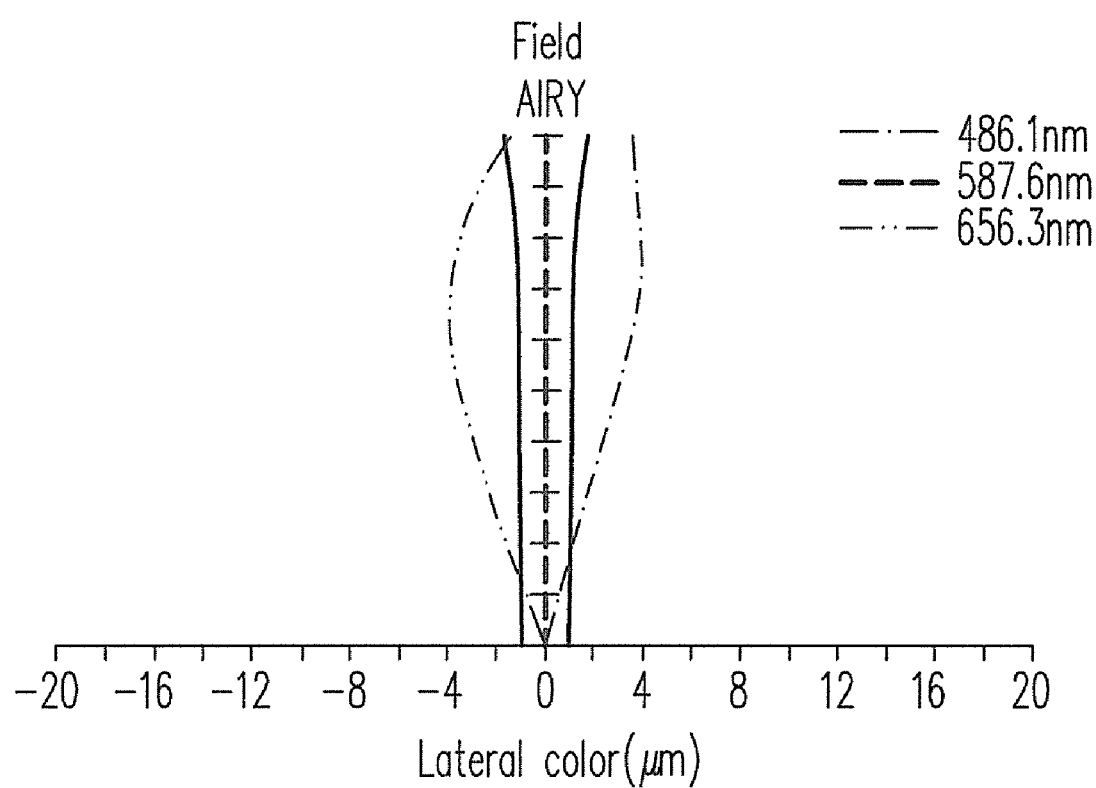

FIGS. 22A-22C are optical imaging simulation data plots of the fixed-focus lens 900b in FIG. 21. Referring to FIGS. 22A-22C, graphs of field curvature and distortion are sequentially illustrated from left to right in FIG. 22A, the graph of spherical aberration is illustrated in FIG. 22B, and the graph of lateral color aberration is illustrated in FIG. 22C. The graphs illustrated in FIGS. 22A-22C indicate that the fixed-focus lens 900b in the present embodiment has very good imaging quality.

Data related to the fixed-focus lenses provided in the first embodiment to the eleventh embodiment is listed in following table 23. However, the data in following table 23 is not intended to limit the scope of the invention, and those having ordinary knowledge in the art should be able to appropriately change the parameters or settings without departing the scope and spirit of the invention.

TABLE 23

| Fixed-focus Lens | Length (mm) L | BFL | L/BEL | \|f/f1\| | \|f/f2\| | \|fasp1/f1\| |
|---|---|---|---|---|---|---|
| 100 | 45.5 | 24.2 | 1.9 | 0.6 | 0.6 | 0.75 |
| 200 | 45.5 | 27.7 | 1.6 | 0.6 | 0.6 | 0.8 |
| 300 | 44.2 | 23.8 | 1.9 | 0.5 | 0.7 | 1.1 |
| 400 | 48.0 | 21.0 | 2.3 | 0.4 | 0.8 | 0.7 |
| 500 | 45.9 | 21.0 | 2.2 | 0.5 | 0.7 | 1.3 |
| 600 | 56.5 | 19.3 | 2.9 | 0.3 | 1.2 | 0.3 |

TABLE 23-continued

| Fixed-focus Lens | Length (mm) L | BFL | L/BEL | \|f/f1\| | \|f/f2\| | \|fasp1/f1\| |
|---|---|---|---|---|---|---|
| 700 | 62.6 | 19.5 | 3.3 | 0.5 | 0.7 | 1.3 |
| 800 | 63.4 | 19.5 | 3.2 | 0.2 | 0.7 | 0.5 |
| 900 | 62.5 | 23.6 | 2.6 | 0.5 | 0.7 | 1.2 |
| 900a | 45.5 | 24.2 | 1.9 | 0.6 | 0.6 | 0.8 |
| 900b | 61.7 | 24.4 | 3.3 | 0.5 | 0.7 | 9.4 |

In summary, an embodiment of the invention has at least one of following advantages or functions. Because the fixed-focus lens in an embodiment of the invention has only five lenses, compared to a conventional fixed-focus lens, the fixed-focus lens in the invention has a simpler structure. In addition, because the fixed-focus lens in an embodiment of the invention adopts two aspheric lenses, the image aberration of the fixed-focus lens can be effectively corrected, and because other lenses are all spherical lenses, the fabrication cost of the fixed-focus lens is effectively reduced. Moreover, the f-number of the fixed-focus lens in an embodiment of the invention is smaller than or equal to 2, and the large aperture results in a high light utilization efficiency. Thereby, the fixed-focus lens in an embodiment of the invention offers low fabrication cost, small volume, and optimal optical characteristics.

Additionally, these claims of invention may refer to use "first", "second", etc. following with noun or element. Such terms should be understood as a nomenclature and should not be construed as giving the limitation on the number of the elements modified by such nomenclature unless specific number has been given.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims.

Moreover, no element and component in the present disclosure is intended to be dedicated to the public regardless of whether the element or component is explicitly recited in the following claims.

What is claimed is:

1. A fixed-focus lens, disposed between an enlarged side and a reduced side, the fixed-focus lens comprising:
    a first lens group, comprising a first lens, wherein the first lens is an aspheric lens; and
    a second lens group, having a positive dioptre, disposed between the first lens group and the reduced side, the second lens group comprising a second lens, wherein the second lens is an aspheric lens,
    wherein an f-number of the fixed-focus lens is smaller than or equal to 2, the fixed-focus lens focuses by moving the first lens group and the second lens group, and the fixed-focus lens satisfies $0.1<|f/f1|<1$, $0.2<|f/f2|<1.5$, and $1.5<L/BEL<3.5$, wherein f is a focal length of the fixed-focus lens, f1 is an effective focal length of the first lens group, f2 is an effective focal length of the second lens group, L is a total length of the fixed-focus lens, and BFL is a back focal length of the fixed-focus lens.

2. The fixed-focus lens according to claim 1, wherein the first lens group further comprises a third lens disposed between the first lens and the second lens group or between the enlarged side and the first lens.

3. The fixed-focus lens according to claim 2, wherein the fixed-focus lens satisfies $0.1<|fasp1/f1|<11$, wherein fasp1 is an effective focal length of the first lens.

4. The fixed-focus lens according to claim 1, wherein the first lens is a meniscus lens having a convex surface facing the enlarged side, and the first lens has a negative dioptre.

5. The fixed-focus lens according to claim 1, wherein the first lens group further comprises a third lens and a fourth lens sequentially arranged from the enlarged side to the reduced side, the third lens and the fourth lens are disposed between the first lens and the second lens group, and the third lens and the fourth lens constitute a cemented doublet lens.

6. The fixed-focus lens according to claim 5, wherein the third lens has a negative dioptre, and the fourth lens has a positive dioptre.

7. The fixed-focus lens according to claim 1, wherein the second lens group further comprises a fifth lens and a sixth lens sequentially arranged from the enlarged side to the reduced side, and the fifth lens and the sixth lens constitute a cemented doublet lens.

8. The fixed-focus lens according to claim 7, wherein the fifth lens has a negative dioptre, and the sixth lens has a positive dioptre.

9. The fixed-focus lens according to claim 1 further comprising an aperture diaphragm disposed between the first lens group and the second lens group.

10. The fixed-focus lens according to claim 9, wherein the second lens has a negative dioptre and is a lens closest to the aperture diaphragm in the second lens group, and the fixed-focus lens satisfies $0.2<|f/f1|<1$, $0.3<|f/f2|<1$, and $1.5<L/BEL<3.5$, wherein f is a focal length of the fixed-focus lens, f1 is an effective focal length of the first lens group, f2 is an effective focal length of the second lens group, L is a total length of the fixed-focus lens, and BFL is a back focal length of the fixed-focus lens.

11. The fixed-focus lens according to claim 10, wherein the first lens is a lens closest to the enlarged side in the first lens group, and the fixed-focus lens satisfies $0.5<|fasp1/f1|<3$, wherein fasp1 is an effective focal length of the first lens.

12. The fixed-focus lens according to claim 10, wherein the first lens group comprises at least two lenses.

13. The fixed-focus lens according to claim 10, wherein the second lens group further comprises a third lens and a fourth lens sequentially arranged from the enlarged side to the reduced side, and the third lens and the fourth lens are disposed between the second lens and the reduced side.

14. The fixed-focus lens according to claim 13, wherein the third lens has a negative dioptre and the fourth lens has a positive dioptre, and the third lens and the fourth lens constitute a cemented doublet lens.

15. The fixed-focus lens according to claim 13, wherein the second lens group further comprises a fifth lens disposed between the fourth lens and the reduced side, and the fifth lens has a positive dioptre.

16. The fixed-focus lens according to claim 9, wherein the second lens has a positive dioptre, the second lens is a lens farthest from the aperture diaphragm in the second lens group, and the fixed-focus lens satisfies $0.1<|f/f1|<1$, $0.2<|f/f2|<1.5$, and $1.8<L/BEL<3.5$, wherein f is a focal length of the fixed-focus lens, f1 is an effective focal length of the first lens group f2 is an effective focal length of the second lens group, L is a total length of the fixed-focus lens, and BFL is a back focal length of the fixed-focus lens.

17. The fixed-focus lens according to claim 9, wherein the first lens group comprises at least two lenses.

18. The fixed-focus lens according to claim 9, wherein the second lens group further comprises a third lens and a fourth lens disposed between the aperture diaphragm and the second lens, and the third lens and the fourth lens constitute a cemented doublet lens.

19. The fixed-focus lens according to claim 18, wherein the third lens has a negative dioptre and the fourth lens has a positive dioptre.

20. The fixed-focus lens according to claim 9, wherein the second lens group comprises at least three lenses, a lens closest to the aperture diaphragm in the second lens group has a negative dioptre, and other lenses in the second lens group have positive dioptre.

* * * * *